US012757114B2

(12) United States Patent
Petel et al.

(10) Patent No.: US 12,757,114 B2
(45) Date of Patent: Oct. 6, 2026

(54) LOCATION DEVICE FOR LOCATING SECONDARY NODES OF A VEHICLE

(71) Applicant: VALEO COMFORT AND DRIVING ASSISTANCE, Créteil (FR)

(72) Inventors: Laurent Petel, Creteil (FR); Christophe Aubreton, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 367 days.

(21) Appl. No.: 18/691,607

(22) PCT Filed: Jul. 29, 2022

(86) PCT No.: PCT/EP2022/071309
§ 371 (c)(1),
(2) Date: Mar. 13, 2024

(87) PCT Pub. No.: WO2023/041234
PCT Pub. Date: Mar. 23, 2023

(65) Prior Publication Data

US 2024/0381247 A1 Nov. 14, 2024

(30) Foreign Application Priority Data

Sep. 17, 2021 (FR) ....................................... 2109824

(51) Int. Cl.
*H04W 52/02* (2009.01)
*H04W 64/00* (2009.01)

(52) U.S. Cl.
CPC ..... *H04W 52/0206* (2013.01); *H04W 64/003* (2013.01)

(58) Field of Classification Search
CPC ........................ H04W 64/003; H04W 52/0206
See application file for complete search history.

(56) References Cited

U.S. PATENT DOCUMENTS 10,276,187 B2 * 4/2019 Gross ...................... G10L 25/51
10,926,738 B1 2/2021 Tucci et al.
(Continued)

FOREIGN PATENT DOCUMENTS

FR 2924818 A1 6/2009

OTHER PUBLICATIONS

International Search Report Issued in Corresponding PCT Application No. PCT/EP2022/071309, dated Nov. 7, 2022. (5 Pages).
(Continued)

*Primary Examiner* — Dai Phuong
(74) *Attorney, Agent, or Firm* — Osha Bergman Watanabe & Burton LLP

(57) ABSTRACT

A location device for locating secondary nodes of a vehicle is disclosed. The location device includes a plurality of nodes including a main node and n secondary nodes, with n=2 to N integers, with the whole forming a vehicle network. The vehicle network includes two sub-networks each independently powered by an electrical power supply. each sub-network includes m secondary nodes, with m=1 to M integers. Each secondary node has a unique network identifier indicating whether it is inside or outside the vehicle. The main node is configured for knowing the architecture of the vehicle network, independently activating and deactivating the electrical power supply of each of the two sub-networks, and identifying and locating at least one reference secondary node in at least one of the two sub-networks by means of its unique network identifier among other functions.

14 Claims, 10 Drawing Sheets

(56) References Cited

U.S. PATENT DOCUMENTS

| | | | | |
|---|---|---|---|---|
| 2015/0131477 | A1* | 5/2015 | Balbierer | H04L 12/12 370/254 |
| 2017/0366430 | A1* | 12/2017 | Seo | H04L 43/0852 |
| 2018/0037155 | A1* | 2/2018 | Danowski | B60Q 1/482 |
| 2020/0124697 | A1 | 4/2020 | Gueble | |
| 2021/0309167 | A1* | 10/2021 | Gourari | G06V 20/56 |

OTHER PUBLICATIONS

Written Opinion of the International Research Administration Issued in Corresponding PCT Application No. PCT/EP2022/071309, dated Nov. 7, 2022. (9 Pages).

* cited by examiner

LOCATION DEVICE FOR LOCATING SECONDARY NODES OF A VEHICLE

The present invention relates to a location device for locating secondary nodes of a vehicle. It is particularly applicable, but not limited, to automotive vehicles.

In the field of motor vehicles, a location device for locating secondary nodes known to a person skilled in the art and described in patent U.S. Pat. No. 10,926,738 B1 comprises a main node and a plurality of secondary nodes all forming a vehicle network. The location device is based on a first secondary node and a second different secondary node, the positions of which are known in the vehicle in order to locate a third secondary node. These two secondary nodes with a known position include physical encoding of a connector so that they can be defined as a reference secondary node for determining the position of a third secondary node, with said connector being used to connect the secondary nodes to a vehicle wire harness. To this end, the location device comprises a main node that is configured for:

- determining a first distance between said third secondary node and said first secondary node, a second distance between said third secondary node and said second secondary node;
- determining, by trilateration, the position of said third secondary node in the motor vehicle based on said first distance and on said second distance, with said position being selected from a set of possible positions of said third secondary node in said motor vehicle. It should be noted that the trilateration comprises computations of coordinates in the orthonormal reference frame of a vehicle.

The main node and the secondary nodes are used to subsequently locate a hands-free access identifier around the motor vehicle.

The main node sends measurement requests to the secondary nodes and in return receives a response that includes a distance measurement between said secondary nodes and said hands-free access identifier. By locating the secondary nodes of the vehicle, the main node can distinguish the different messages sent by the different secondary nodes and recover the distance measurement in a message sent by a secondary node, while knowing which secondary node is the source of this distance measurement. The main node can subsequently correctly complete a geometric reconstruction (such as a triangulation) based on all the distance measurements in order to determine the position of said hands-free access identifier relative to the motor vehicle. The hands-free access identifier notably allows a PEPS ("Passive Entry Passive Start") function to be implemented. This PEPS function allows the motor vehicle to be unlocked when the hands-free access identifier approaches the vehicle, and thus allows access to said vehicle, and also authorizes the start-up of the motor vehicle.

In this context, the aim of the present invention is to propose a location device for locating secondary nodes of a vehicle that offers an alternative to the location device for locating secondary nodes of the prior art.

To this end, the invention proposes a location device for locating secondary nodes of a vehicle, said location device comprising a plurality of nodes, including a main node and n secondary nodes, with n=2 to N integers, with the whole forming a vehicle network, characterized in that said vehicle network comprises two sub-networks each independently powered by an electrical power supply, each sub-network each comprising m secondary nodes, with m=1 to M integers, each secondary node having a unique network identifier indicating whether it is inside or outside said vehicle, and in that:

(a) the main node is configured for:
- knowing the architecture of the vehicle network;
- independently activating and deactivating the electrical power supply of each of the two sub-networks;
- identifying and locating at least one reference secondary node in at least one of the two sub-networks by means of its unique network identifier;
- sending a command to said at least one reference secondary node to measure a distance between itself and the other secondary nodes of one of the two sub-networks;
- receiving said distances and comparing them with each other;
- locating said other secondary nodes as a function of the architecture of the vehicle network and of said comparison;
- locating a secondary node in a sub-network comprising a single secondary node that is not said at least one reference secondary node as a function of the architecture of the vehicle network;

(b) said at least one reference secondary node is configured for:
- measuring a distance between itself and the other secondary nodes of one of the two sub-networks;
- sending said main node a distance between itself and the other secondary nodes of one of the two sub-networks;

(c) each secondary node is configured for sending its unique network identifier to said main node when said sub-network it belongs to is powered.

By virtue of this location device and the division into sub-networks, determining a position of a secondary node is simpler than a trilateration, because it does not require carrying out trigonometric computations in order to determine the relative position of the secondary nodes in the vehicle reference frame, but it only and simply requires comparisons of distances.

By virtue of this location device, physical encoding of the connector in a reference secondary node is not required. Only the unique network identifier is needed to distinguish a reference secondary node from another secondary node, notably in order to know whether it is inside or outside the vehicle, as opposed to the other secondary nodes in some cases. This unique network identifier solution is a more flexible solution for producing the vehicle network. The vehicle network is simpler to produce and is less expensive.

Moreover, by virtue of this location device, locating the secondary nodes in a vehicle is automatic. An external intervention by an external operator is not necessary.

According to non-limiting embodiments, said location device can further comprise one or more additional features taken individually or in any technically possible combination, from among the following.

According to one non-limiting embodiment, if $n>2$, then said at least one reference secondary node is located at different distances from the other secondary nodes. In particular, it is located at different distances from the other secondary nodes of the same sub-network.

According to one non-limiting embodiment, if $n<=3$, then said main node is configured for identifying and locating a single reference secondary node.

According to one non-limiting embodiment, said reference secondary node is located in a sub-network where $m=1$.

According to one non-limiting embodiment, if $n=2$, and $m=1$ for each of the two sub-networks, then said main node is further configured for:

activating the electrical power supply of said sub-network where said reference secondary node is located so that it can be identified and located;

activating the electrical power supply of the other sub-network in order to be able to locate its single secondary node as a function of the architecture of the vehicle network.

According to one non-limiting embodiment, if n=2, and m=1 for each of the two sub-networks, said main node is further configured for deactivating the electrical power supply of said sub-network after locating said reference secondary node.

According to one non-limiting embodiment, if n=3, and m=1 for one of the two sub-networks and m=2 for the other one of the two sub-networks, then said main node is further configured for:

activating the power supply of said sub-network where said reference secondary node is located so that it can be identified and located, sending the command, receiving said distances and comparing them, and locating said other secondary nodes in the other sub-network as a function of the architecture of the vehicle network and of said comparison;

activating the power supply of the other sub-network after locating said reference secondary node and before sending the command;

and wherein said reference secondary node is configured for measuring a distance between itself and the other secondary nodes of the other sub-network.

According to one non-limiting embodiment, if n>=6, then said main node is configured for identifying and locating at least two reference secondary nodes.

According to one non-limiting embodiment, each reference secondary node is located inside the vehicle, while the other secondary nodes of said sub-network to which each reference secondary node belongs are located outside, or vice versa.

According to one non-limiting embodiment, if m=3 for a sub-network, only one reference secondary node is located in said sub-network and said main node is further configured for:

activating the power supply of said sub-network in order to be able to identify and locate its reference secondary node, sending said command, receiving said distances and comparing them, and locating the other secondary nodes in said sub-network as a function of the architecture of the vehicle network and of said comparison, and wherein said reference secondary node of said sub-network is configured for measuring a distance between itself and the other secondary nodes of the sub-network to which it belongs.

According to one non-limiting embodiment, if m=3 for a sub-network, said main node is further configured for deactivating the electrical power supply of said sub-network after locating the other secondary nodes.

According to one non-limiting embodiment, if m=4 for a sub-network, two reference secondary nodes are located in said sub-network.

According to one non-limiting embodiment, said main node is further configured for:

activating the power supply of said sub-network;

identifying the two reference secondary nodes by means of their unique network identifier; —sending a command, respectively to the two reference secondary nodes, so that they measure distances between themselves and the other secondary nodes of said sub-network, respectively resulting in primary distances and secondary distances;

receiving said primary distances and said secondary distances;

comparing each primary distance with each secondary distance corresponding to the same other secondary node;

locating said reference secondary nodes as a function of the architecture of the vehicle network and of the comparisons;

comparing the primary distances with each other and the secondary distances with each other;

locating said other secondary nodes as a function of the architecture of the vehicle network and of said comparisons;

and wherein each of the two reference secondary nodes is configured for measuring a distance between itself and the other secondary nodes of the sub-network to which it belongs.

According to one non-limiting embodiment, if m=4 for a sub-network, said main node is further configured for deactivating the electrical power supply of said sub-network after locating the other secondary nodes.

According to one non-limiting embodiment, m is equal to or different from one sub-network to another sub-network.

The invention also proposes a location method for locating secondary nodes of a vehicle comprising a plurality of nodes, including a main node and n secondary nodes, linked together via a vehicle network, with n=1 to N integers, with each secondary node having a unique network identifier indicating whether it is inside or outside said vehicle, said vehicle network comprising two sub-networks each independently powered by an electrical power supply, with each sub-network each comprising m secondary nodes, with m=1 to M integers, characterized in that said method comprises the steps of:

activating, by said main node, the electrical power supply of a first sub-network;

sending, by the m secondary nodes of said first sub-network, said main node their unique network identifier;

identifying and locating, by said main node, a reference secondary node in said first sub-network by means of its unique network identifier;

(a) if n=2:

activating, by said main node, the electrical power supply of the second sub-network;

sending, by the secondary node of said second sub-network, said main node its unique network identifier;

identifying and locating, by said main node, the secondary node in said second sub-network as a function of the architecture of the vehicle network, with said architecture of the vehicle network being known to said main node;

(b) if n=3:

activating, by said main node, the power supply of the second sub-network;

sending, by said main node, a command to said reference secondary node to measure a distance between itself and each other secondary node of said second sub-network;

measuring, by said reference secondary node, a distance between itself and each other secondary node and returning it to said main node;

receiving, by said main node, said distances and comparing them with each other;

locating, by said main node, said other secondary nodes in said second sub-network as a function of the architecture of the vehicle network and of said comparison;

(c) if n=6 or n=7:

sending, by said main node, a command to said reference secondary node to measure a distance between itself and each other secondary node of said first sub-network;

measuring, by said reference secondary node, a distance between itself and each other secondary node and returning it to said main node;

receiving, by said main node, said distances and comparing them with each other;

locating, by said main node, said other secondary nodes in said first sub-network as a function of the architecture of the vehicle network and of said comparison activating the electrical power supply of said second sub-network;

sending, by the m secondary nodes of said second sub-network, said main node their unique network identifier;

(i) if n=6:

identifying and locating, by said main node, a reference secondary node in said second sub-network by means of its unique network identifier;

repeating the steps of sending a command, of measuring distance, of returning the distances, of receiving the distances, of comparing the distances, and of locating the other secondary nodes for said second sub-network;

(ii) if n=7:

identifying, by said main node, two reference secondary nodes in said second sub-network by means of their unique network identifier; and, for each of the two reference secondary nodes:

sending, by said main node, a command to said reference secondary nodes to measure a distance between themselves and each other secondary node of said second sub-network;

measuring, by said reference secondary nodes, a distance between themselves and each other secondary node and returning them to said main node;

receiving, by said main node, primary distances originating from one of the two reference secondary nodes, and secondary distances originating from the other one of the two reference secondary nodes;

comparing each primary distance with each secondary distance corresponding to the same other secondary node;

locating the two reference secondary nodes as a function of the architecture of the vehicle network and of said comparison;

comparing the primary distances with each other and the secondary distances with each other;

locating said other secondary nodes of said second sub-network as a function of the architecture of the vehicle network and of said comparison.

According to one non-limiting embodiment, the electrical power supplies of the two sub-networks are initially deactivated.

According to one non-limiting embodiment, said location method further comprises a step for all the cases n of deactivating the power supply of said first sub-network after locating the other secondary nodes of said first sub-network as described above, and deactivating the power supply of said second sub-network after locating the other secondary nodes of said second sub-network as described above.

The invention and the various applications thereof will be better understood from reading the following description and with reference to the accompanying figures, in which.

Elements that are identical in terms of structure or function and that appear in various figures have been designated using the same reference signs, unless otherwise indicated.

The location device 1 for locating secondary nodes 11 of a vehicle 2 according to the invention is described with reference to FIGS. 1 to 5.

In one non-limiting embodiment, the vehicle 2 is a motor vehicle. The term motor vehicle is understood to mean any type of motorized vehicle. This embodiment will be considered, by way of a non-limiting example, throughout the remainder of the description. Throughout the remainder of the description, the vehicle 2 is thus also called motor vehicle 2.

Figure 1:
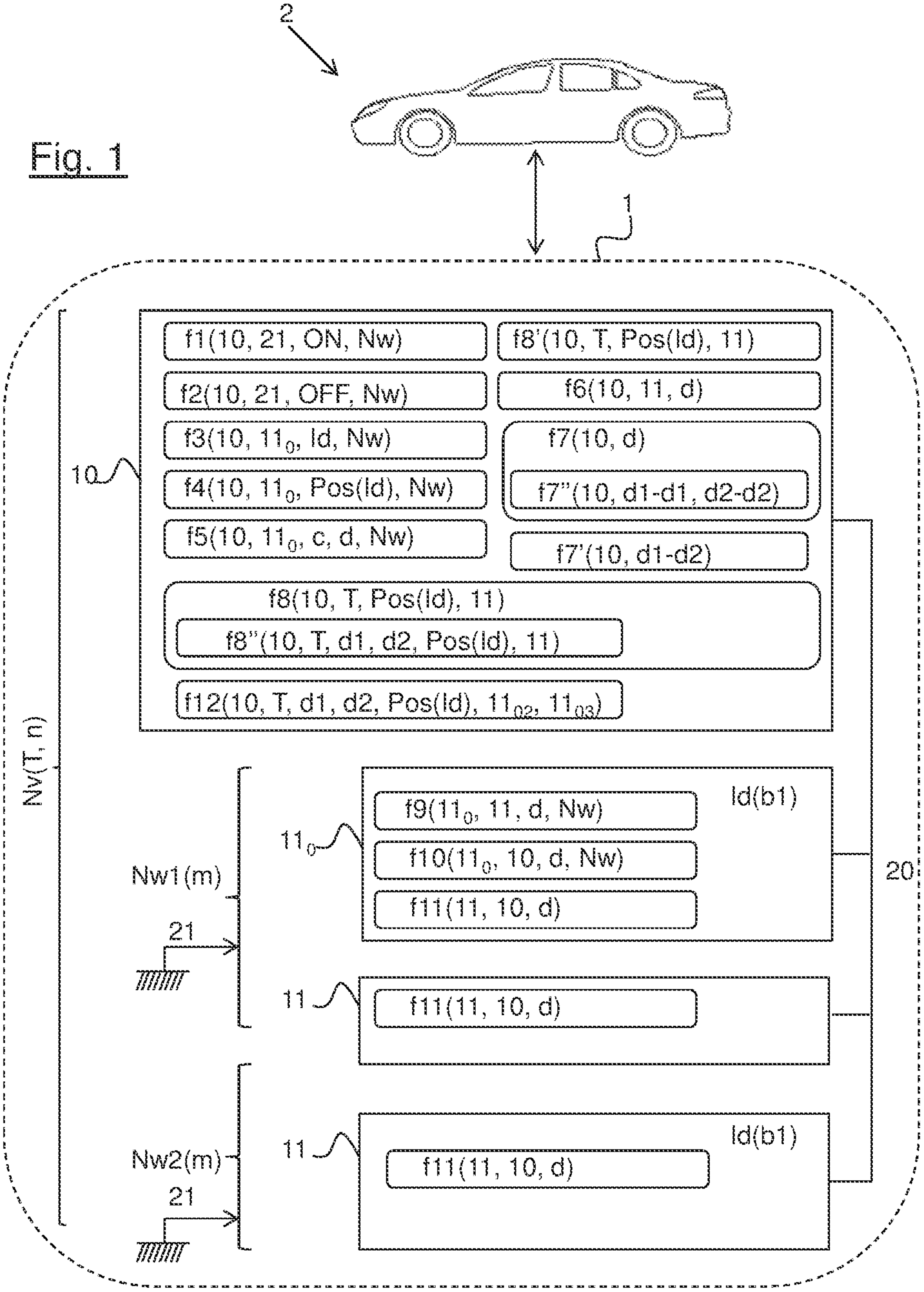
FIG. 1 is a schematic view of a location device for locating secondary nodes, with said location device comprising a main node and said secondary nodes, according to one non-limiting embodiment of the invention.

As illustrated in FIG. 1, the location device 1 comprises a plurality of nodes, including a main node 10 and n secondary nodes 11, with n=2 to N, with the whole forming a vehicle network Nv. The nodes are connected via a wired network 20. In non-limiting embodiments, the wired network 20 is a CAN (Control Area Network), LIN (Local Interconnect Network), LAN (Local Area Network), FLEXRAY or any other type of wired network.

In one non-limiting embodiment, the main node 10 (called "Hub") is an electronic control unit. In one non-limiting embodiment, the secondary nodes 11 (called "Anchor") are beacons, also called satellites or anchors.

In one non-limiting embodiment, the nodes 10, 11 of the vehicle network Nv are used to locate a hands-free access identifier (not illustrated) around the motor vehicle 2. The hands-free access identifier allows a PEPS ("Passive Entry Passive Start") function to be implemented. The PEPS function allows the motor vehicle 2 to be unlocked/locked and authorized to start-up. In order to locate said hands-free access identifier around the motor vehicle 2, the main node 10 sends the secondary nodes 11 distance measurement requests and each secondary node 11 sends return messages that notably comprise a distance measurement between itself and the hands-free access identifier.

The vehicle network Nv comprises two sub-networks Nw1, Nw2, including a first sub-network Nw1 and a second sub-network Nw2.

Each sub-network Nw1, Nw2 is each independently powered by an electrical power supply 21, also called power supply 21. The motor vehicle 2 thus comprises two power supplies 21. Each sub-network Nw1, Nw2 comprises m secondary nodes 11, with m=1 to M integers. m can be different from one sub-network Nw1, Nw2 to the other. Thus, each sub-network Nw1, Nw2 can contain a different number of secondary nodes 11 from the other sub-network Nw2, Nw1.

Each secondary node 11 has a unique network identifier Id indicating whether it is located inside or outside said motor vehicle 2. In one non-limiting embodiment, the unique network identifier Id is coded on 8 bits (i.e., one byte). It comprises a bit b1 indicating whether the secondary node 11 is located inside or outside the motor vehicle 2. Thus, in a non-limiting example, if the bit=0, the secondary node 11 is inside, and if the bit=1, the secondary node 11 is outside. The unique network identifier Id further comprises a unique identification code that allows one secondary node 11 to be differentiated from another secondary node 11.

The main node 10 is configured to know the architecture T of the vehicle network Nv, namely it knows:

- the number of secondary nodes 11 in each sub-network Nw;
- the positions Pos that the secondary nodes 11 can assume in each sub-network Nw;
- how many reference secondary nodes $\mathbf{11}_0$ (described below) there are in each sub-network Nw;
- the position Pos of the reference secondary node $\mathbf{11}_0$ in the sub-network Nw, if there is only one reference secondary node $\mathbf{11}_0$.

However, knowledge of the architecture T does not imply identification of said secondary nodes 11. Thus, the main node 10 does not know the exact position Pos that is assumed by a specific secondary node 11 in a sub-network Nw. For example, knowing the architecture T of the vehicle network Nv, in the non-limiting embodiment of FIG. 2, the main node 10 simply knows that there is a secondary node 11 at the centre-front position Pos and another secondary node 11 at the centre-rear position Pos, but it does not know that it is the secondary node 11*a* that is at the centre-front position Pos and the secondary node 11*b* that is at the centre-rear position Pos.

Furthermore, if there are several reference secondary nodes $\mathbf{11}_0$ in a sub-network Nw, knowledge of the architecture T does not imply knowledge of their position Pos in said sub-network Nw. In this case, the main node 10 must launch a location sequence (described hereafter) in order to locate the exact position Pos of the various reference secondary nodes $\mathbf{11}_0$.

As will be seen hereafter, the main node 10 will be able to associate a unique network identifier Id with a position Pos for each secondary node 11 so as to be able to distinguish between them. It thus will be able to know which secondary node 11 it is addressing in order to send a distance measurement request, and will be able to distinguish the return messages from the various secondary nodes 11 that pass through the wired network 20 following distance measurement requests.

As illustrated in FIG. 1, the main node 10 is configured for independently activating and deactivating the power supply 21 of each sub-network Nw1, Nw2 (functions illustrated in FIG. 1 as f1(10, 21, ON, Nw) for activation and f2(10, 21, OFF, Nw) for deactivation).

As illustrated in FIG. 1, the main node 10 is further configured for:

- identifying (function illustrated in FIG. 1 as f3(10, $\mathbf{11}_0$, Id, Nw)) and locating at least one reference secondary node $\mathbf{11}_0$ in at least one of the two sub-networks Nw by means of its unique network identifier Id (function illustrated in FIG. 1 as f4(10, $\mathbf{11}_0$, Pos(Id), Nw)). Locating is understood to mean associating a unique network identifier Id at a position Pos in the motor vehicle 2.

In one non-limiting embodiment, if n>2, then said at least one reference secondary node $\mathbf{11}_0$ is located at different distances d from the other secondary nodes 11.

In one non-limiting embodiment, if n<=3, then said main node 10 is configured for identifying and locating a single reference secondary node $\mathbf{11}_0$. In this case, in one non-limiting embodiment, said reference secondary node $\mathbf{11}_0$ is located in a sub-network Nw where m=1.

In one non-limiting embodiment, if n>=6, said main node 10 is configured for identifying and locating at least two reference secondary nodes $\mathbf{11}_0$. In this case, in one non-limiting embodiment, each reference secondary node $\mathbf{11}_0$ is located inside the vehicle 2, while the other secondary nodes 11 of said sub-network Nw to which each reference secondary node $\mathbf{11}_0$ belongs are located outside, or vice versa.

In one non-limiting embodiment, if m=3 in a sub-network Nw, a single reference secondary node $\mathbf{11}_0$ is located in said sub-network Nw. Thus, the main node 10 is configured for identifying and locating a single reference secondary node $\mathbf{11}_0$ in said sub-network Nw.

In one non-limiting embodiment, if m=4 in a sub-network Nw, two reference secondary nodes $\mathbf{11}_0$ are located in said sub-network Nw. Thus, the main node 10 is configured for identifying and locating two reference secondary nodes $\mathbf{11}_0$ in said sub-network Nw.

The main node 10 is further configured for:

- sending a command c to said at least one reference secondary node $\mathbf{11}_0$ to measure a distance d between itself and the other secondary nodes 11 of one of the two sub-networks Nw (function illustrated in FIG. 1 as f5(10, $\mathbf{11}_0$, c, d, Nw));
- receiving said distances d (function illustrated in FIG. 1 as f6(10, 11, d)) and comparing them with each other (function illustrated in FIG. 1 as f7(10, d));
- locating said other secondary nodes 11 (function illustrated in FIG. 1 as f8(10, T, Pos(Id), 11)), namely associating a unique network identifier Id with a position Pos in the motor vehicle 2 for each of the other secondary nodes 11, as a function of the architecture T of the vehicle network Nv and of said comparison.

Figure 2:
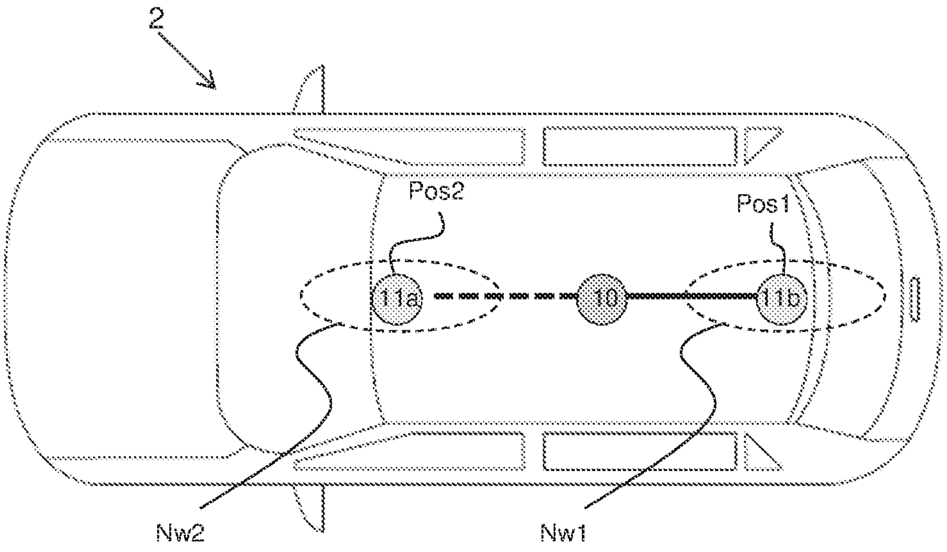
FIG. 2 is a top view of a vehicle comprising the location device of FIG. 1, with said location device comprising two secondary nodes each distributed over two sub-networks, according to a first non-limiting embodiment.

As illustrated in FIG. 1, the main node 10 is further configured for:

locating a secondary node 11 in a sub-network Nw comprising a single secondary node 11 that is not said at least one reference secondary node $11_0$ (function illustrated in FIG. 1 as f8'(10, T, Pos(Id), 11)) as a function of the architecture T of the vehicle network Nv. It should be noted that this function is applied when n=2, as illustrated in FIG. 2.

As illustrated in FIG. 1, said at least one reference secondary node $11_0$ is configured for:

measuring a distance d between itself and the other secondary nodes 11 of one of the two sub-networks Nw (function illustrated as in FIG. 1 f9($11_0$, 11, d, Nw));

sending said main node 10 a distance d between itself and the other secondary nodes 11 of one of the two sub-networks Nw (function illustrated in FIG. 1 as f10($11_0$, 10, d, Nw)).

It should be noted that a reference secondary node $11_0$ can thus measure a distance d between itself and the other secondary nodes 11 of the sub-network Nw to which it belongs, or between itself and the other secondary nodes 11 of the other sub-network Nw to which it does not belong.

It should be noted that, for the sake of clarity, a single reference secondary node $11_0$ in a sub-network Nw has been illustrated in FIG. 1.

Each secondary node 11 is configured for sending its unique network identifier Id to the main node 10 when said sub-network Nw to which it belongs is powered (function illustrated in FIG. 1 as f11(11, 10, Id)).

FIGS. 2 to 5 illustrate various non-limiting embodiments of the vehicle network Nv. It should be noted that the connecting lines (a solid line or a dashed line) illustrated between the main node 10 and the various secondary nodes 11 represent the wired electrical power supply networks.

As will be seen hereafter, the main node 10 identifies and locates a reference secondary node $11_0$ either via the power supply 21 of said sub-network Nw to which the reference secondary node $11_0$ belongs when it is the only node powered by said power supply 21 (in the case where n=2 and n=3), or (in the case where n=6 and n=7) by distinguishing them from the other secondary nodes 11 via its bit b1, which indicates:

that it is inside the motor vehicle 2 as opposed to the other secondary nodes 11, which are outside; or conversely: that it is outside the motor vehicle 2 as opposed to the other secondary nodes 11, which are inside.

According to a first non-limiting embodiment illustrated in FIG. 2, the vehicle network Nv comprises three nodes, including the main node 10 and two secondary nodes 11 (n=2), with the first sub-network Nw1 comprising a secondary node 11 (m=1) and the second sub-network Nw2 also comprising a secondary node 11 (m=1). The two secondary nodes 11 are located inside the motor vehicle 2. In FIG. 2, the first sub-network Nw1 is shown as a solid line and the second sub-network Nw2 is shown as a dashed line.

In the illustrated non-limiting example:

the two secondary nodes 11 are referenced 11*a* and 11*b;* the secondary node 11*b* forms part of the first sub-network Nw1 and the secondary node 11*a* forms part of the second sub-network Nw2;

the secondary node 11*a* is located at the centre-front of the motor vehicle 2 and the secondary node 11*b* is located at the centre-rear of the motor vehicle 2.

The main node 10 knows the architecture T of the vehicle network Nv, namely it knows that a secondary node 11 is positioned at the centre-front and that a secondary node 11 is positioned at the centre-rear. There is a single reference secondary node $11_0$. In the illustrated non-limiting example, the reference secondary node $11_0$ is the secondary node 11*b*.

In this case, the main node 10 is configured for:

activating the power supply 21 of the first sub-network Nw1 in order to be able to identify (function f1 described above) and locate (function f2 described above) the reference secondary node $11_0$ in the first sub-network Nw1 by means of its unique network identifier Id.

When the first sub-network Nw1 is powered, the secondary node 11*b* can send its unique network identifier Id to the main node 10 (function f11 described above). The main node 10 thus identifies the reference secondary node $11_0$ (function f3 described above).

Based on said unique network identifier Id, and as a function of the architecture T of the vehicle network Nv, the main node 10 determines that said secondary node 11*b* is the reference secondary node $11_0$ in the first sub-network Nw1. Indeed, as the main node 10 knows that there is only one reference secondary node $11_0$ and that it is located in the first sub-network Nw1, it locates it, namely it associates its unique network identifier Id with its position Pos in the motor vehicle 2 (function f4 described above). It thus determines that the secondary node 11*b* is the node that is located at the centre-rear of the motor vehicle 2. It should be noted that, in this case where n=2, it does not matter whether the reference secondary node $11_0$ is inside or outside the motor vehicle 2.

After locating as described above, in one non-limiting embodiment, the main node 10 is configured for deactivating the power supply of the first sub-network Nw1 (function f2 described above). This allows the electrical consumption of the motor vehicle 2 to be reduced.

Then, the main node 10 is configured for activating the power supply of said second sub-network Nw2 (function f1 described above) in order to be able to locate the single secondary node 11 in said second sub-network Nw as a function of the architecture T of the vehicle network Nv.

When the second sub-network Nw2 is powered, the secondary node 11*a* can send its unique network identifier Id to the main node 10 (function f11 described above). Based on said unique network identifier Id, and as a function of the architecture T of the vehicle network Nv, the main node 10 locates the secondary node 11*a*. It associates its unique network identifier Id with its position Pos (function f8' described above). It thus determines that the secondary node 11*a* is the node that is located at the centre-front of the motor vehicle 2.

The main node 10 has thus found which secondary node 11 is located at the front of the motor vehicle 2 and which secondary node 11 is located at the rear. It can now distinguish them.

When it has finished locating all the secondary nodes 11 of the vehicle network Nv, in this case 11*a* and 11*b*, in one non-limiting embodiment, the main node 10 is further configured for deactivating the power supply 21 of the second sub-network Nw2 (function f2 described above). This allows the electrical consumption of the motor vehicle 2 to be reduced. Of course, when the nodes 10 and 11 must be used when the motor vehicle 2 is running, the power supply 21 of the first sub-network Nw1, and that of the second sub-network Nw2, are once again activated.

It should be noted that the non-limiting embodiment has been provided for two secondary nodes 11 located inside the motor vehicle 2, but the same principle applies for two secondary nodes 11 located outside, or for a secondary node 11 located inside and a secondary node 11 located outside.

Figure 3:
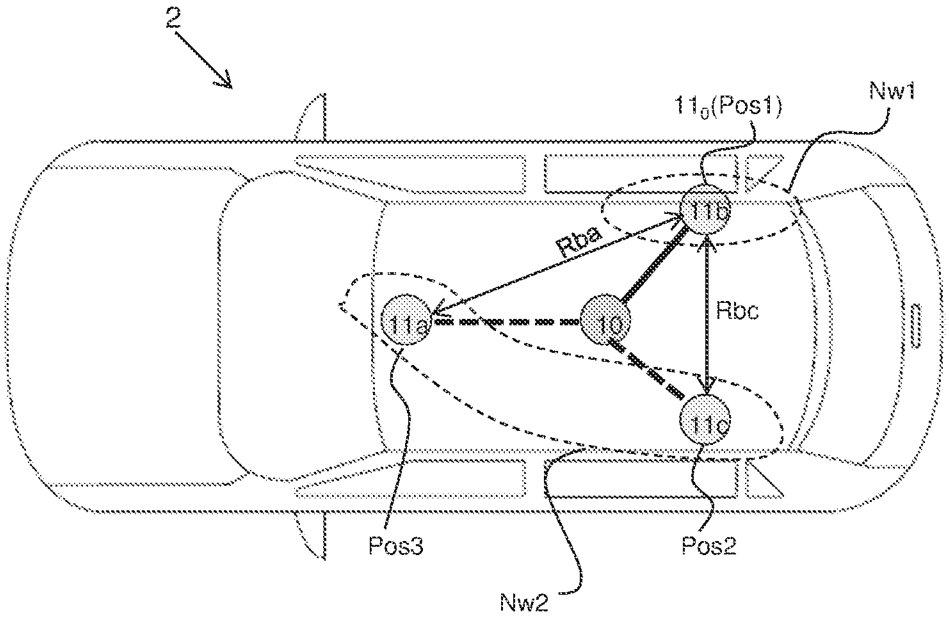
FIG. 3 is a top view of a vehicle comprising the location device of FIG. 1, with said location device comprising three secondary nodes distributed over two sub-networks, according to a first non-limiting embodiment.

According to a second non-limiting embodiment illustrated in FIG. 3, the vehicle network Nv comprises four nodes, including the main node 10 and three secondary nodes 11 (n=3), with the first sub-network Nw1 comprising a secondary node 11 (m=1) and the second sub-network Nw2 comprising 2 secondary nodes 11 (m=2). In FIG. 3, the first sub-network Nw1 is shown as a solid line and the second sub-network Nw2 is shown as a dashed line.

In the illustrated non-limiting example:

- the three secondary nodes 11 are referenced 11*a*, 11*b* and 11*c;*
- the three secondary nodes 11*a*, 11*b* and 11*c* are located inside the motor vehicle 2;
- the secondary node 11*b* forms part of the first sub-network Nw1, while the secondary 11*a* and the secondary node 11*b* form part of the second sub-network Nw2;
- the secondary node 11*a* is positioned at the centre-front and inside the motor vehicle 2;
- the secondary node 11*b* is positioned at the centre-right and inside the motor vehicle 2; and
- the secondary node 11*c* is positioned at the centre-left and inside the motor vehicle 2.

According to this second non-limiting embodiment, there is a single reference secondary node $\mathbf{11}_0$, which is the secondary node 11*b*. It is located in the first sub-network Nw1, which comprises only one secondary node 11.

It should be noted that the reference secondary node $\mathbf{11}_0$ is defined such that it is located at different distances d from the other secondary nodes 11. Thus, the secondary node 11*b* is not at the same distance d from the secondary node 11*a* and from the secondary node 11*c*. This will allow the secondary node 11*a* to be distinguished from the secondary node 11*c*.

In this case, the main node 10 is configured for:

- activating the power supply 21 of the first sub-network Nw1 (function f1 described above) in order to be able to identify and locate the reference secondary node $\mathbf{11}_0$ in the first sub-network Nw1 by means of its unique network identifier Id, notably of the bit indicating whether it is inside or outside.

When the first sub-network Nw1 is powered, the secondary node 11*b* can send its unique network identifier Id to the main node 10 (function f11 described above). The main node 10 thus identifies the reference secondary node $\mathbf{11}_0$ (function f3 described above).

Based on said unique network identifier Id, and as a function of the architecture T of the vehicle network Nv, the main node 10 determines that said secondary node 11*b* is the reference secondary node $\mathbf{11}_0$ in the first sub-network Nw1. Indeed, as the main node 10 knows that there is only one reference secondary node $\mathbf{11}_0$ in the first sub-network Nw1, and that it is located inside, it locates it, namely it associates its unique network identifier Id with its position Pos in the motor vehicle 2 (function f4 described above). In the non-limiting example, it associates the unique network identifier Id of the secondary node 11*b* with the centre-right position Pos.

After locating as described above and before sending the command c described above, the main node 10 is configured for activating the power supply 21 of the second sub-network Nw2 (function f1 described above). It should be noted that the main node 10 does not deactivate the power supply 21 of the first sub-network Nw1 because it will use the reference secondary node $\mathbf{11}_0$, in this case 11*b*, of said first sub-network Nw1 to measure distances with the secondary nodes 11 of the second sub-network Nw2.

When the second sub-network Nw2 is powered, the secondary node 11*a* and the secondary node 11*c* can send their unique network identifier Id to the main node 10 (function f11 described above).

After receiving the unique network identifiers Id of the secondary nodes 11*a* and 11*c* as described above, the main node 10 is configured for:

- sending the command c to the reference secondary node $\mathbf{11}_0$ to measure a distance d between itself and the other secondary nodes 11 of the second sub-network Nw2, namely the secondary nodes 11*a* and 11*c* (function f5 described above).

It should be noted that the main node 10 can send this command c because it knows the unique network identifier Id of the reference secondary node $\mathbf{11}_0$.

Upon receipt of the command c, the reference secondary node $\mathbf{11}_0$, in this case 11*b*, is configured for measuring distances d (function f9 described above) and returning two distances d, referenced Rba and Rbc in FIG. 3, to the main node 10, which distances are respectively the distance between itself and the secondary node 11*a* and the distance between itself and the secondary node 11*c* (function f10 described above).

Upon receipt of the distances Rba and Rbc (function f6 described above), the main node 10 is configured for comparing them (function f7 described above). Thus, it can see that Rba is greater than Rbc.

As a function of the architecture T of the vehicle network Nv and of said comparison, the main node 10 can associate the unique network identifiers Id of the secondary node 11*a* and of the secondary node 11*c* with positions Pos in the vehicle network Nv. Indeed, it knows that there is a secondary node 11 in the second sub-network Nw2 that is located at the centre-front and that is further away from the reference secondary node $\mathbf{11}_0$ that is located at the centre-right, and another that is located at the centre-left that is closer to the reference secondary node $\mathbf{11}_0$ that is located at the centre-right. It thus locates said secondary nodes 11*a* and 11*c* of the second sub-network Nw2 (function f7 described above). As Rba>Rbc, the main node 10 thus determines that the secondary node 11*a* is the node that is located at the centre-front of the motor vehicle 2 and that the secondary node 11*c* is the node that is located at the centre-left.

When it has finished locating all the secondary nodes 11 of the vehicle network Nv, in one non-limiting embodiment, the main node 10 is further configured for deactivating the power supply 21 of the first sub-network Nw1 and for deactivating the power supply 21 of the second sub-network Nw2 (function f2 described above).

It should be noted that the non-limiting embodiment has been provided for three secondary nodes 11 located inside the motor vehicle 2, but the same principle applies for three secondary nodes 11 located outside, or for any other combination of nodes inside or outside.

Figure 4:
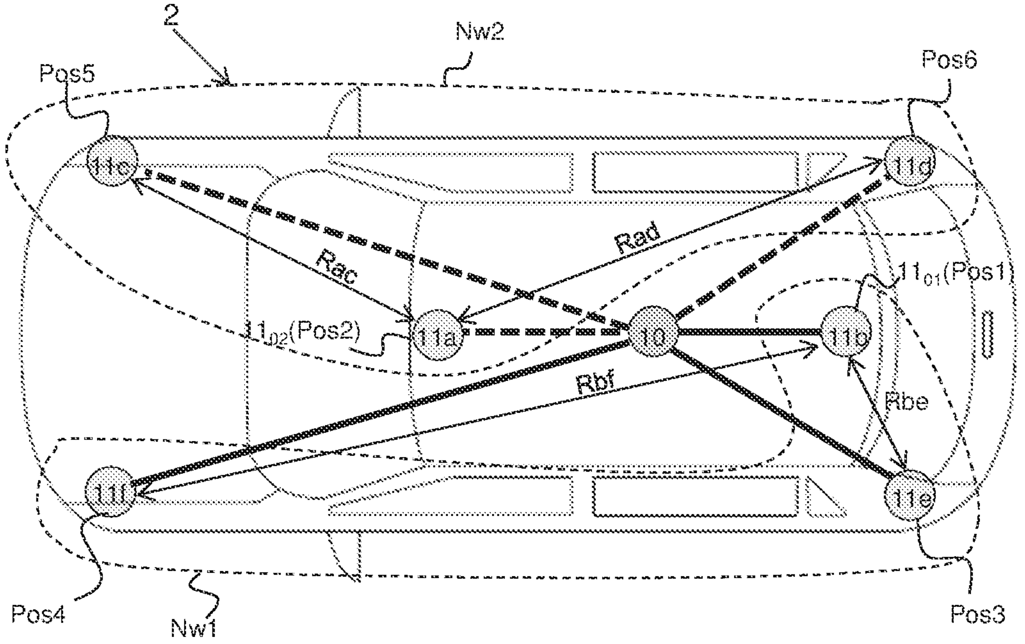
FIG. 4 is a top view of a vehicle comprising the location device of FIG. 1, with said location device comprising six secondary nodes distributed over two sub-networks, according to a first non-limiting embodiment.

According to a third non-limiting embodiment illustrated in FIG. 4, the vehicle network Nv comprises seven nodes, including the main node 10 and six secondary nodes 11 (n=6), with the first sub-network Nw1 comprising three secondary nodes 11 (m=3) and the second sub-network Nw2 also comprising three secondary nodes 11 (m=3). In FIG. 4, the first sub-network Nw1 is shown as a solid line and the second sub-network Nw2 is shown as a dashed line.

In the illustrated non-limiting example:

the six secondary nodes 11 are referenced 11*a*, 11*b*, 11*c*, 11*d*, 11*e* and 11*f*;

the secondary nodes 11*b*, 11*e* and 11*f* form part of the first sub-network Nw1 and the secondary nodes 11*a*, 11*c*, 11*d* form part of the second sub-network Nw2;

the secondary node 11*a* is positioned at the centre-front and inside the motor vehicle 2;

the secondary node 11*b* is positioned at the centre-rear and inside the motor vehicle 2;

the secondary node 11*c* is positioned at the front-right and outside the motor vehicle 2;

the secondary node 11*d* is positioned at the rear-right and outside the motor vehicle 2;

the secondary node 11*e* is positioned at the rear-left and outside the motor vehicle 2;

the secondary node 11*f* is positioned at the front-left and outside the motor vehicle 2.

According to this third non-limiting embodiment, there are two reference secondary nodes $\mathbf{11}_{01}$ and $\mathbf{11}_{02}$, each respectively located in a sub-network Nw1, Nw2 and inside the motor vehicle 2. In the illustrated non-limiting example, the reference secondary node $\mathbf{11}_{01}$ is located in the first sub-network Nw1 and is the secondary node 11*b*, and the reference secondary node $\mathbf{11}_{02}$ is located in the second sub-network Nw2 and is the secondary node 11*a*.

A reference secondary node $\mathbf{11}_{0}$ is located inside the motor vehicle 2, unlike the other secondary nodes 11 of the same sub-network Nw, which are located outside, or vice versa: a reference secondary node $\mathbf{11}_{0}$ is located outside the motor vehicle 2, unlike the other secondary nodes 11 of the same sub-network Nw, which are located inside. Thus, the main node 10 knows, via the architecture T of the vehicle network Nv, that a secondary node 11 is inside a sub-network Nw that is the reference secondary node $\mathbf{11}_{0}$ and that two other secondary nodes 11 are outside said sub-network Nw.

It should be noted that the reference secondary node $\mathbf{11}_{01}$ is defined such that it is located at different distances d from the other secondary nodes 11 of the first sub-network Nw1. Thus, the secondary node 11*b* is not at the same distance d from the secondary node 11*e* as it is from the secondary node 11*f*. This will allow the secondary node 11*e* to be distinguished from the secondary node 11*f*.

Similarly, the reference secondary node $\mathbf{11}_{02}$ is defined such that it is located at different distances d from the other secondary nodes 11 of the second sub-network Nw2. Thus, the secondary node 11*a* is not at the same distance d from the secondary node 11*c* as it is from the secondary node 11*d*. This will allow the secondary node 11*c* to be distinguished from the secondary node 11*d*.

The main node 10 operates on the same principle as for the second non-limiting embodiment and thus uses the same functions. Thus, the description provided for the third non-limiting embodiment applies for each sub-network Nw1, Nw2, except that the distances d measured between a reference secondary node $\mathbf{11}_{0}$ are the distances d measured between itself and the other secondary nodes 11 of the sub-network Nw to which it belongs and not the other secondary nodes 11 of the other sub-network Nw.

In this case, the main node 10 is configured for:

activating the power supply 21 of the first sub-network Nw1 (function f1 described above) in order to be able to identify and locate the reference secondary node $\mathbf{11}_{01}$ in the first sub-network Nw1 by means of its unique network identifier Id, notably of the bit b1 indicating whether it is inside or outside.

When the first sub-network Nw1 is powered, the secondary node 11*b*, which is the reference secondary node $\mathbf{11}_{01}$, can send its unique network identifier Id to the main node 10 (function f11 described above), as well as the other secondary nodes 11 of the first sub-network Nw1. The main node 10 thus identifies the reference secondary node $\mathbf{11}_{01}$ (function f3 described above).

Based on said unique network identifier Id, and as a function of the architecture T of the vehicle network Nv, the main node 10 determines that said secondary node 11*b* is the reference secondary node $\mathbf{11}_{01}$ in the first sub-network Nw1. Indeed, as the main node 10 knows that there is only one reference secondary node $\mathbf{11}_{0}$ in the first sub-network Nw1, and that it is located inside the autonomous vehicle 2, unlike the other secondary nodes 11 of the first sub-network Nw1, which are located outside, the main node 10 therefore locates it, namely it associates its unique network identifier Id with its position Pos in the motor vehicle (function f4 described above), in this case at the centre-rear.

After locating as described above, the main node 10 is configured for:

sending the command c to the reference secondary node $\mathbf{11}_{01}$ to measure a distance d between itself and the other secondary nodes 11 of the first sub-network Nw1, namely in this case the secondary nodes 11*e* and 11*f* (function f5 described above).

It should be noted that the main node 10 can send this command c because it knows the unique network identifier Id of the reference secondary node $\mathbf{11}_{01}$.

Upon receipt of the command c, the reference secondary node $\mathbf{11}_{01}$, in this case 11*b*, is configured for measuring distances d (function f9 described above) between itself and the other secondary nodes 11 of the first sub-network Nw1, in this case 11*e* and 11*f*, and returning two distances d, referenced Rbe and Rbf, to the main node 10, which distances are respectively the distance between itself and the secondary node 11*e* and the distance between itself and the secondary node 11*f* (function f10 described above).

Upon receipt of the distances Rbe and Rbf (function f6 described above), the main node 10 is configured for comparing them (function f7 described above). Thus, it can see that Rbf is greater than Rbe.

As a function of the architecture T of the vehicle network Nv and of said comparison, the main node 10 can associate the unique network identifiers Id of the secondary node 11*e* and of the secondary node 11*f* with positions Pos in the vehicle network Nv. Indeed, it knows that there is a secondary node 11 in the first sub-network Nw1 that is located at the front-left and that is further away from the reference secondary node $\mathbf{11}_{01}$ that is located at the centre-rear, and another that is located at the rear-left that is closer to the reference secondary node $\mathbf{11}_{01}$ that is located at the centre-rear. It thus locates said secondary nodes 11*e* and 11*f* of the first sub-network Nw1 (function f7 described above). As Rbf>Rbe, the main node 10 thus determines that the secondary node 11*e* is the node that is located at the rear-left of the motor vehicle 2 and that the secondary node 11*f* is the node that is located at the front-left.

When the main node 10 has finished locating the secondary nodes 11 of the first sub-network Nw1, it does exactly the same for the second sub-network Nw2.

In one non-limiting embodiment, the main node 10 is configured for deactivating the power supply 21 of the first sub-network Nw1 (function f2 described above). Deactivating the power supply 21 of the first sub-network Nw1 allows the electrical consumption of the motor vehicle 2 to be reduced. It should be noted that the step of deactivating the power supply 21 of the first sub-network Nw1 is optional.

The main node 10 is configured for activating the power supply 21 of the second sub-network Nw2 (function f1 described above), which allows the secondary nodes 11 of the second sub-network Nw2 to be considered.

When the second sub-network Nw2 is powered, the secondary node 11_a_, which is the reference secondary node $\mathbf{11}_{02}$, can send its unique network identifier Id to the main node 10 (function f11 described above), as well as the other secondary nodes 11 of the second sub-network Nw2. The main node 10 thus identifies the reference secondary node $\mathbf{11}_{02}$ (function f3 described above).

Based on said unique network identifier Id, and as a function of the architecture T of the vehicle network Nv, the main node 10 determines that said secondary node 11_a_ is the reference secondary node $\mathbf{11}_{02}$ in the second sub-network Nw2. Indeed, as the main node 10 knows that there is only one reference secondary node $\mathbf{11}_{0}$ in the second sub-network Nw2 and that it is located inside the motor vehicle 2, unlike the other secondary nodes 11 of the second sub-network Nw2, which are located outside, the main node 10 locates it, namely it associates its unique network identifier Id with its position Pos in the motor vehicle 2 (function f4 described above). It thus determines that the secondary node 11_a_ is the node that is located at the centre-front of the motor vehicle 2.

After locating as described above, the main node 10 is configured for:

- sending the command c to the reference secondary node $\mathbf{11}_{02}$ to measure a distance d between itself and the other secondary nodes 11 of the second sub-network Nw2, namely in this case the secondary nodes 11_c_ and 11_d_ (function f5 described above).

It should be noted that the main node 10 can send this command c because it knows the unique network identifier Id of the reference secondary node $\mathbf{11}_{02}$.

Upon receipt of the command c, the reference secondary node $\mathbf{11}_{02}$, in this case 11_a_, is configured for measuring distances d (function f9 described above) between itself and the other secondary nodes 11 of the second sub-network Nw2, in this case 11_c_ and 11_d_, and returning two distances d, referenced Rac and Rad, to the main node 10, which distances are respectively the distance between itself and the secondary node 11_c_ and the distance between itself and the secondary node 11_d_ (function f10 described above).

Upon receipt of the distances Rac and Rad (function f6 described above), the main node 10 is configured for comparing them (function f7 described above). Thus, it can see that Rad is greater than Rac.

As a function of the architecture T of the vehicle network Nv and of said comparison, the main node 10 can associate the unique network identifiers Id of the secondary node 11_c_ and of the secondary node 11_d_ with positions Pos in the vehicle network Nv. Indeed, it knows that there is a secondary node 11 in the second sub-network Nw2 that is located at the front-right and that is closer to the reference secondary node $\mathbf{11}_{02}$ that is located at the centre-front, and another that is located at the rear-right that is further away from the reference secondary node $\mathbf{11}_{02}$ that is located at the centre-front. It thus locates said secondary nodes 11_c_ and 11_d_ of the second sub-network Nw2 (function f7 described above). As Rad>Rac, the main node 10 thus determines that the secondary node 11_c_ is the node that is located at the front-right of the motor vehicle 2 and that the secondary node 11_d_ is the node that is located at the rear-right.

When it has finished locating all the secondary nodes 11 of the vehicle network Nv, in one non-limiting embodiment, the main node 10 is further configured for deactivating the power supply 21 of the first sub-network Nw1 and for deactivating the power supply 21 of the second sub-network Nw2 (function f2 described above).

It should be noted that the non-limiting embodiment has been provided for three secondary nodes 11 of a sub-network Nw, the reference secondary node $\mathbf{11}_{0}$ of which is located inside the motor vehicle 2 and the other two secondary nodes 11 are located outside, but the same principle applies for three secondary nodes 11 of a sub-network Nw, the reference secondary node $\mathbf{11}_{0}$ of which is located outside the motor vehicle 2 and the other two secondary nodes 11 are located inside. This allows a secondary node 11 to be distinguished from the other secondary nodes 11, so that it acts as a reference secondary node $\mathbf{11}_{0}$. It also should be noted that the non-limiting embodiment has been provided for two reference secondary nodes $\mathbf{11}_{01}$ and $\mathbf{11}_{02}$ located inside the motor vehicle 2, the other secondary nodes 11 are located outside the motor vehicle 2, but the same principle applies for two reference secondary nodes $\mathbf{11}_{01}$ and $\mathbf{11}_{02}$ located outside the motor vehicle 2 and the other secondary nodes 11 are located inside the motor vehicle 2.

Figure 5:
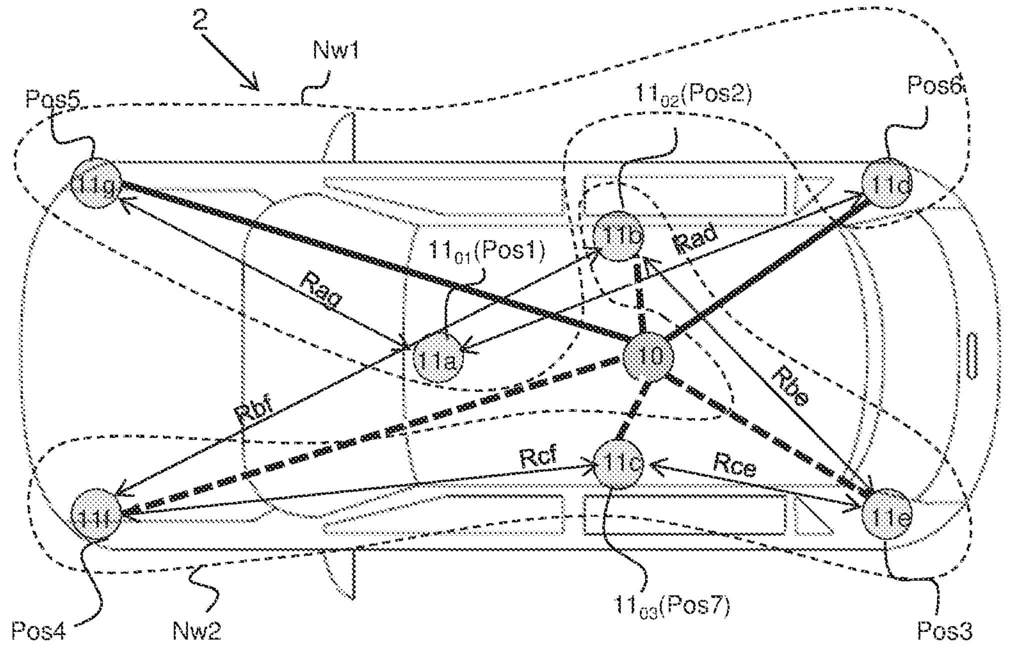
FIG. 5 is a top view of a vehicle comprising the location device of FIG. 1, with said location device comprising seven secondary nodes distributed over two sub-networks, according to a first non-limiting embodiment.

According to a fourth non-limiting embodiment illustrated in FIG. 5, the vehicle network Nv comprises eight nodes, including the main node 10 and seven secondary nodes 11 (n=7), with the first sub-network Nw1 comprising three secondary nodes 11 (m=3) and the second sub-network Nw2 comprising four secondary nodes 11 (m=4). In FIG. 5, the first sub-network Nw1 is shown as a solid line and the second sub-network Nw2 is shown as a dashed line.

In the illustrated non-limiting example:

- the seven secondary nodes 11 are referenced 11_a_, 11_b_, 11_c_, 11_d_, 11_e_, 11_f_ and 11_g;_
- the secondary nodes 11_a_, 11_d_ and 11_g_ form part of the first sub-network Nw1 and the secondary nodes 11_b_, 11_c_, 11_e_ and 11_f_ form part of the second sub-network Nw2;
- the secondary node 11_a_ is positioned at the centre-front and inside the motor vehicle 2;
- the secondary node 11_b_ is positioned at the centre-right and inside the motor vehicle 2;
- the secondary node 11_c_ is positioned at the centre-left and outside the motor vehicle 2; —the secondary node 11_d_ is positioned at the rear-right and outside the motor vehicle 2;
- the secondary node 11_e_ is positioned at the rear-left and outside the motor vehicle 2;
- the secondary node 11_f_ is positioned at the front-left and outside the motor vehicle 2;
- the secondary node 11_g_ is positioned at the front-right and outside the motor vehicle 2.

According to this fourth non-limiting embodiment, there are three secondary nodes referenced $\mathbf{11}_{01}$, $\mathbf{11}_{02}$ and $\mathbf{11}_{03}$, one of which is located in the first sub-network Nw1, which comprises three secondary nodes 11, and two of which are located in the second sub-network Nw2, which comprises four secondary nodes 11. In the illustrated non-limiting example:

- the reference secondary node $\mathbf{11}_{01}$ in the first sub-network Nw1 is the secondary node 11_a;_
- the reference secondary node $\mathbf{11}_{02}$ in the second sub-network Nw2 is the secondary node 11_b_; and
- the reference secondary node $\mathbf{11}_{03}$ in the second sub-network Nw2 is the secondary node 11_c_.

It should be noted that the reference secondary node $\mathbf{11}_{01}$ is defined such that it is located at different distances d from the other secondary nodes 11 of the first sub-network Nw1. Thus, the secondary node 11*a* is not at the same distance d from the secondary node 11*d* as it is from the secondary node 11*g*. This will allow the secondary node 11*d* to be distinguished from the secondary node 11*g*. Similarly:

- the reference secondary node $\mathbf{11}_{02}$ is defined such that it is located at different distances d from the other secondary nodes 11 of the second sub-network Nw2. Thus, the secondary node 11*b* is not at the same distance d from the secondary node 11*e* as it is from the secondary node 11*f* and as it is from the other reference secondary node 11*c*; and
- the reference secondary node $\mathbf{11}_{03}$ is defined such that it is located at different distances d from the other secondary nodes 11 of the second sub-network Nw2. Thus, the secondary node 11*c* is not at the same distance d from the secondary node 11*e* as it is from the secondary node 11*f* and as it is from the other reference secondary node 11*b*.

This will allow the secondary node 11*e* to be distinguished from the secondary node 11*f*.

Furthermore, when there is a single reference secondary node $\mathbf{11}_0$ in a sub-network Nw, in this case in the first sub-network Nw1, it should be noted that the reference secondary node $\mathbf{11}_0$ is located inside the motor vehicle 2, unlike the other secondary nodes 11 of the same sub-network Nw, which are located outside, or vice versa: the reference secondary node $\mathbf{11}_0$ is located outside the motor vehicle 2, unlike the other secondary nodes 11 of the same sub-network Nw, which are located inside. Thus, the secondary node 11*a* is located inside, while the secondary nodes 11*c* and 11*d* are located outside. Thus, the main node 10 knows, via the architecture T of the vehicle network Nv, that there is a secondary node 11 inside the first sub-network Nw that is the reference secondary node $\mathbf{11}_0$ and that two other secondary nodes 11 are located outside said first sub-network Nw1.

Furthermore, when there are two reference secondary nodes $\mathbf{11}_0$ in a sub-network Nw, in this case in the second sub-network Nw2, it should be noted that a reference secondary node $\mathbf{11}_0$ is located inside the motor vehicle 2, unlike the other secondary nodes 11 of the same sub-network Nw, which are located outside, or vice versa: a reference secondary node $\mathbf{11}_0$ is located outside the motor vehicle 2, unlike the other secondary nodes 11 of the same sub-network Nw, which are located inside. Thus, the secondary node 11*b* and the secondary node 11*c* are located inside, while the secondary nodes 11*e* and 11*f* are located outside. Thus, the main node 10 knows, via the architecture T of the vehicle network Nv, that there are two reference secondary nodes $\mathbf{11}_0$ inside the second sub-network Nw2 and two other secondary nodes 11 outside said second sub-network Nw2.

The same principle described in the third non-limiting embodiment applies for the sub-network Nw comprising three secondary nodes 11, in this case the first sub-network Nw1.

Thus, in this case, the main node 10 is configured for:

- activating the power supply 21 of the first sub-network Nw1 (function f1 described above) in order to be able to identify and locate the reference secondary node $\mathbf{11}_{01}$ in the first sub-network Nw1 by means of its unique network identifier Id, notably of the bit b1 indicating whether it is inside or outside.

When the first sub-network Nw1 is powered, the secondary node 11*a*, which is the reference secondary node $\mathbf{11}_{01}$, can send its unique network identifier Id to the main node 10 (function f11 described above), as well as the other secondary nodes 11 of the first sub-network Nw1. The main node 10 thus identifies the reference secondary node $\mathbf{11}_{01}$ (function f3 described above).

Based on said unique network identifier Id, and as a function of the architecture T of the vehicle network Nv, the main node 10 determines that said secondary node 11*a* is the reference secondary node $\mathbf{11}_{01}$ in the first sub-network Nw1. Indeed, as the main node 10 knows that there is only one reference secondary node $\mathbf{11}_0$ in the first sub-network Nw1, and that it is located inside the motor vehicle 2, unlike the other secondary nodes 11 of the first sub-network Nw1, which are located outside, the main node 10 therefore locates it, namely it associates its unique network identifier Id with its position Pos in the motor vehicle 2 (function f4 described above), in this case at the centre-front.

After locating as described above, the main node 10 is configured for:

- sending the command c to the reference secondary node $\mathbf{11}_{01}$ to measure a distance d between itself and the other secondary nodes 11 of the first sub-network Nw1, namely in this case the secondary nodes 11*d* and 11*g* (function f5 described above).

It should be noted that the main node 10 can send this command c because it knows the unique network identifier Id of the reference secondary node $\mathbf{11}_{01}$.

Upon receipt of the command c, the reference secondary node $\mathbf{11}_{01}$, in this case 11*a*, is configured for measuring distances d (function f9 described above) between itself and the other secondary nodes 11 of the second sub-network Nw1, in this case 11*d* and 11*g*, and returning two distances d, referenced Rad and Rag, to the main node 10, which distances are respectively the distance between itself and the secondary node 11*d* and the distance between itself and the secondary node 11*g* (function f10 described above).

Upon receipt of the distances Rad and Rag (function f6 described above), the main node 10 is configured for comparing them (function f7 described above). Thus, it can see that Rad is greater than Rag.

As a function of the architecture T of the vehicle network Nv and of said comparison, the main node 10 can associate the unique network identifiers Id of the secondary node 11*d* and of the secondary node 11*g* with positions Pos in the vehicle network Nv. Indeed, it knows that there is a secondary node 11 in the first sub-network Nw1 that is located at the front-right and that is closer to the reference secondary node $\mathbf{11}_{01}$ that is located at the centre-front, and another that is located at the rear-right that is further away from the reference secondary node $\mathbf{11}_{01}$ that is located at the centre-front. It thus locates said secondary nodes 11*d* and 11*g* of the first sub-network Nw1 (function f7 described above). As Rad>Rag, the main node 10 thus determines that the secondary node 11*d* is the node that is located at the rear-right of the motor vehicle 2 and that the secondary node 11*g* is the node that is located at the front-right.

When the main node 10 has finished locating the secondary nodes 11 of the first sub-network Nw1, it transitions to the second sub-network Nw2.

In one non-limiting embodiment, the main node 10 is configured for deactivating the power supply 21 of the first sub-network Nw1 (function f2 described above). Deactivating the power supply 21 of the first sub-network Nw1 allows the electrical consumption of the motor vehicle 2 to be reduced. It should be noted that the step of deactivating the power supply 21 of the first sub-network Nw1 is optional.

The main node 10 is configured for activating the power supply 21 of the second sub-network Nw2 (function f1 described above), which allows the secondary nodes 11 of the second sub-network Nw2 to be considered.

When the second sub-network Nw2 is powered, the secondary node 11*b* that is the reference secondary node $\mathbf{11}_{02}$ can send their unique network identifier Id to the main node 10 (function f11 described above). Similarly, the secondary node 11*c* that is the reference secondary node $\mathbf{11}_{03}$ can send its unique network identifier Id to the main node 10 (function f11 described above), as well as the other secondary nodes 11 of the second sub-network Nw2. The main node 10 thus identifies the reference secondary node $\mathbf{11}_{02}$ and the reference secondary node $\mathbf{11}_{03}$ in the second sub-network Nw2 (function f3 described above). The main node 10 identifies them with respect to the other secondary nodes 11 from which it has also received the unique network identifiers Id, since it knows that the two reference secondary nodes $\mathbf{11}_{02}$ and $\mathbf{11}_{03}$ are inside the motor vehicle 2, unlike the other secondary nodes 11, which are outside (in the non-limiting example).

The main node 10 has identified them, but it does not yet know how to locate them, namely it does not yet know their exact position Pos: it does not yet know how to differentiate the reference secondary node $\mathbf{11}_{02}$ from the reference secondary node $\mathbf{11}_{03}$.

After they are identified, the main node 10 is configured for:

- sending the command c to the reference secondary node $\mathbf{11}_{02}$ to measure distances d, called primary distances d1, between itself and the other secondary nodes 11 of the second sub-network Nw2 (which are not the reference secondary node $\mathbf{11}_{03}$), namely in this case the secondary nodes 11*e* and 11*f* (function f5 described above); and
- sending the command c to the reference secondary node $\mathbf{11}_{03}$ to measure distances d, called secondary distances d2, between itself and the other secondary nodes 11 of the second sub-network Nw2 (which are not the reference secondary node $\mathbf{11}_{02}$), namely in this case the secondary nodes 11*e* and 11*f* (function f5 described above).

It should be noted that the commands c are sent either sequentially or at the same time.

It should be noted that the reference secondary node $\mathbf{11}_{02}$ does not need to measure the distance d from the reference secondary node $\mathbf{11}_{03}$. The main node 10 notifies it as such via the command c. Similarly, it should be noted that the reference secondary node $\mathbf{11}_{03}$ does not need to measure the distance d from the reference secondary node $\mathbf{11}_{02}$. The main node 10 notifies it as such via the command c.

It should be noted that the main node 10 can send these commands c because it knows the unique network identifier Id of the reference secondary node $\mathbf{11}_{02}$, and the unique network identifier Id of the reference secondary node $\mathbf{11}_{03}$.

Upon receipt of the command c, the reference secondary node $\mathbf{11}_{02}$, in this case 11*b*, is configured for measuring distances d (function f9 described above) between itself and the other secondary nodes 11 of the second sub-network Nw2, in this case 11*e* and 11*f*, and returning two primary distances d1, referenced Rbe and Rbf, to the main node 10, which distances are respectively the distance between itself and the secondary node 11*e* and the distance between itself and the secondary node 11*f* (function f10 described above).

Upon receipt of the command c, the reference secondary node $\mathbf{11}_{03}$, in this case 11*c*, is configured for measuring distances d (function f9 described above) between itself and the other secondary nodes 11 of the second sub-network Nw2, in this case 11*e* and 11*f*, and returning two secondary distances d2, referenced Rce and Rcf, to the main node 10, which distances are respectively the distance between itself and the secondary node 11*e* and the distance between itself and the secondary node 11*f* (function f10 described above).

Upon receipt of the primary distances Rbe and Rbf, and of the secondary distances Rce and Rcf, the main node 10 is configured for comparing them with each other in accordance with a primary comparison (function f7'(10, d1-d2)) and in accordance with a secondary comparison (function illustrated in FIG. 1 as f7"(10, d1-d1, d2-d2)).

The primary comparison will allow the reference secondary node $\mathbf{11}_{02}$ and the reference secondary node $\mathbf{11}_{03}$ to be differentiated and thus located. Thus, the main node 10 is configured for comparing each primary distance d1 with each secondary distance d2 corresponding to the same other secondary node 11. Thus, in the non-limiting example of FIG. 5, the main node 10 compares Rce and Rbe, and Rcf and Rbf.

Thus, the main node 10 is configured for locating the two reference secondary nodes $\mathbf{11}_{02}$, $\mathbf{11}_{03}$ of the second sub-network Nw2 as a function of the architecture T of the vehicle network Nv and of said primary comparison (function illustrated in FIG. 1 as f12(10, T, d1, d2, Pos(Id), $\mathbf{11}_{02}$, $\mathbf{11}_{03}$)). Previously, the main node 10 had identified that the reference secondary nodes $\mathbf{11}_{02}$, $\mathbf{11}_{03}$ could be located at a centre-left position Pos or at a centre-right position Pos. In the illustrated non-limiting example, Rce<Rbe and Rcf<Rbf. The main node 10 determines that the reference secondary node $\mathbf{11}_{03}$ (namely the secondary node 11*c*) is closer to the two secondary nodes 11*e* and 11*f* than the reference secondary node $\mathbf{11}_{02}$ (namely the secondary node 11*b*). It therefore deduces that the reference secondary node $\mathbf{11}_{03}$ is therefore positioned at the centre-left, and that the reference secondary node $\mathbf{11}_{03}$ is therefore positioned at the centre-right. It therefore associates the unique network identifier Id of the secondary node 11*b* with the centre-left position Pos, and the unique network identifier Id of the secondary node 11*c* with the centre-right position Pos (function f4 described above). As a function of the architecture T of the vehicle network Nv and of said comparisons, the main node 10 has thus located said secondary node 11*b*, which is one of the two reference secondary nodes $\mathbf{11}_0$ in the second sub-network Nw2, in this case $\mathbf{11}_{02}$, and said secondary node 11*c*, which is the other one of the two reference secondary nodes $\mathbf{11}_0$, in this case $\mathbf{11}_{03}$, in the second sub-network Nw2.

The secondary comparison (function f7") will allow the other secondary nodes 11 of the second sub-network Nw2 to be located. Thus, the main node 10 is configured for comparing the primary distances d1 with each other and the secondary distances d2 with each other. Thus, the main node 10 compares Rce and Rcf, and compares Rbe and Rbf. In the illustrated non-limiting example, Rce<Rcf and Rbe<Rbf. It should be noted that the function f7" is a special case of the function f7 when there are two reference secondary nodes $\mathbf{11}_0$.

As Rce<Rcf, the main node 10 determines that the secondary node 11*e* is closer to the reference secondary node $\mathbf{11}_{03}$, in this case 11*c*, than the secondary node 11*f*. As Rbe<Rbf, the main node 10 determines that the secondary node 11*e* is also closer to the reference secondary node $\mathbf{11}_{02}$, in this case 11*b*, than the secondary node 11*f*. The main node 10 therefore associates:

- the unique network identifier Id of the secondary node 11*e* with the left rear position Pos that is closer to the centre-left position Pos and the centre-right position than the front-left position; and the unique network identifier Id of the secondary node 11*f* with the front-left position Pos that is further away from the centre-left position Pos and the centre-right position than the front-left position.

Thus, the main node 10 is configured for locating the other secondary nodes 11 of the second sub-network Nw2 as a function of the architecture T of the vehicle network Nv and of said secondary comparison (function illustrated as f8"(10, T, d1, d2, Pos(Id), 11)). As a function of the architecture T of the vehicle network Nv and of said secondary comparison, the main node 10 has thus located the other secondary nodes 11*e* and 11*f* in the second sub-network Nw2. It should be noted that the function f8" is a special case of the function f8 when there are two reference secondary nodes.

When it has finished locating all the secondary nodes 11 of the vehicle network Nv, in one non-limiting embodiment, the main node 10 is further configured for deactivating the power supply 21 of the second sub-network Nw2 (function f2 described above).

Thus, the location device 1 for locating the secondary nodes 11 of a vehicle 2 allows a location method 4 to be implemented as illustrated in FIGS. 6 to 12. Thus, the location method 4 for locating secondary nodes 11 of a vehicle 2 comprising a plurality of nodes, including a main node 10 and n secondary nodes 11, linked together via a vehicle network Nv, with n=1 to N integers, with each secondary node 11 having a unique network identifier Id indicating whether it is inside or outside said vehicle 2, said vehicle network Nv comprising two sub-networks Nw1, Nw2, including a first sub-network Nw1 and a second sub-network Nw2, each independently powered by a power supply 21, the first sub-network Nw1 and the second sub-network Nw2 each comprising m secondary nodes 11, with m=1 to M integers, comprises the following steps.

It should be noted that, initially, the power supply 21 of the first sub-network Nw1 and the power supply 21 of the second sub-network Nw2 are deactivated.

Figure 6:
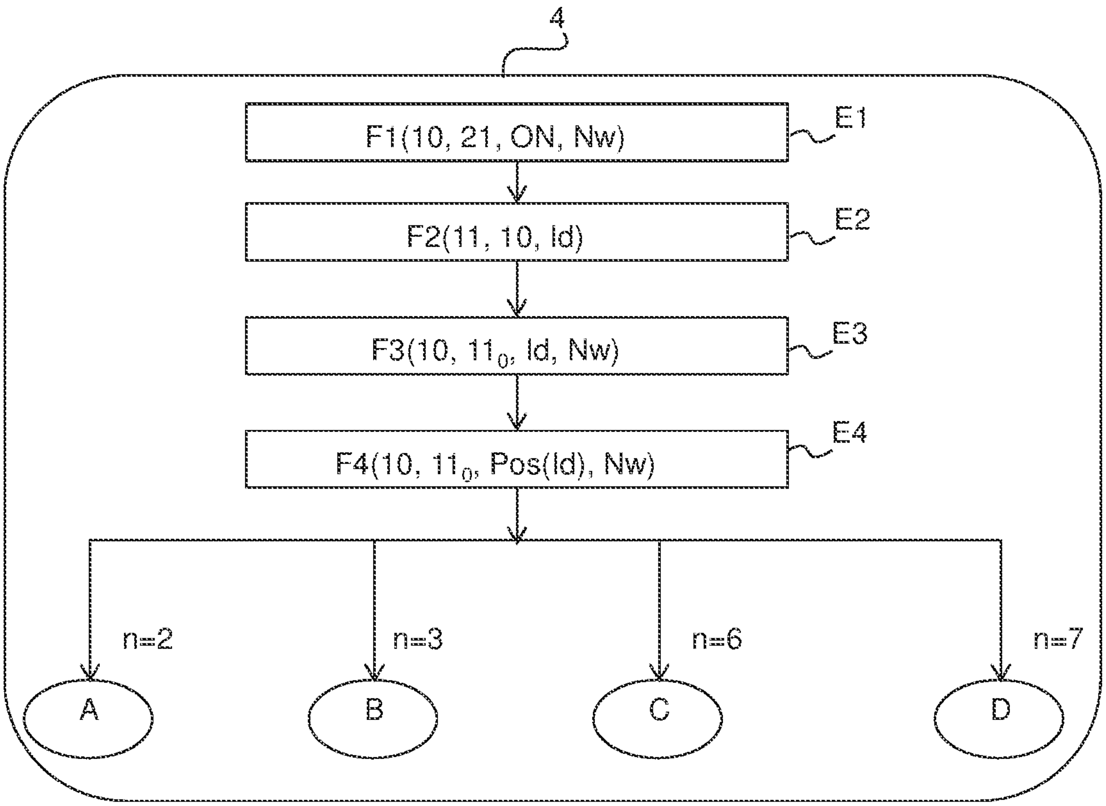
FIG. 6 is a diagram illustrating a location method for locating secondary nodes implemented by the location device of FIG. 1, according to one non-limiting embodiment.

As illustrated in FIG. 6, in a step E1, illustrated as F1(10, 21, ON, Nw), the main node 10 activates the power supply 21 of the first sub-network Nw1.

In a step E2, illustrated as F2(11, 10, Id), the m secondary nodes 11 of said first network Nw1 send said main node 10 their unique network identifier Id. They send it as soon as the first sub-network Nw1 is powered.

In a step E3, illustrated as F3(10, $\mathbf{11}_0$, Id, Nw), the main node 10 identifies the reference secondary node $\mathbf{11}_0$ by means of its unique network identifier Id.

As the main node 10 knows the architecture T of the vehicle network Nv, and notably of each sub-network Nw, it will know from their unique network identifier Id which secondary nodes 11 are located inside or outside the motor vehicle 2. In the case where n>2 and m>2, as a function of the architecture T and of the received unique identifiers Id, it will be possible to determine a reference secondary node $\mathbf{11}_0$ as being that which is inside, while the other secondary nodes 11 of the second sub-network Nw2 are located outside, or vice versa.

In a step E4, illustrated as F4(10, $\mathbf{11}_0$, Pos(Id), Nw), a reference secondary node $\mathbf{11}_0$ is located in said first sub-network Nw1 by means of its unique network identifier Id.

The following steps depend on the number n of secondary nodes 11 in the vehicle network Nv. Thus, the following steps of the location method 4 will be described depending on whether n=2 (diagram A of FIG. 7), n=3 (diagram B of FIG. 8), n=6 (diagram C of FIGS. 9 and 10) or n=7 (diagram D of FIGS. 11 and 12). It should be noted that the location device 1 is thus configured to implement said location method 4, with its configuration being a function of the number n of secondary nodes 11 in the vehicle network Nv.

Figure 7:
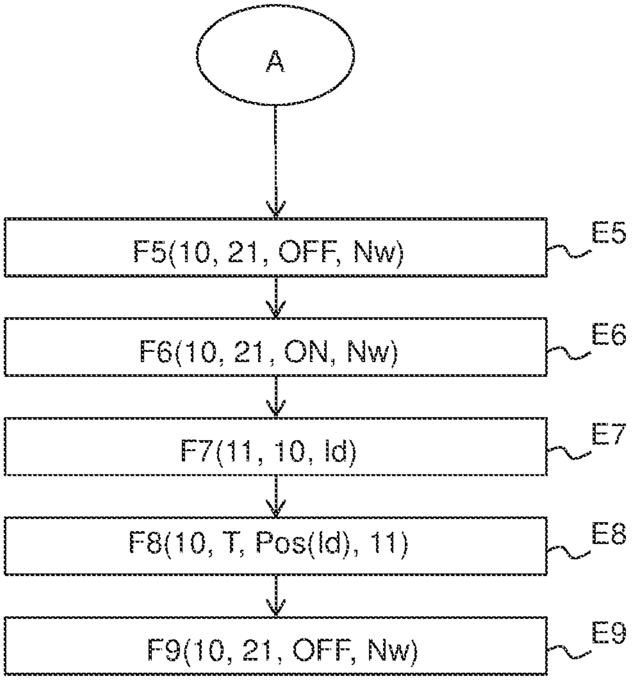
FIG. 7 is a diagram illustrating the location method of FIG. 6 implemented when the vehicle network comprises two secondary nodes, according to one non-limiting embodiment.
Figure 8:
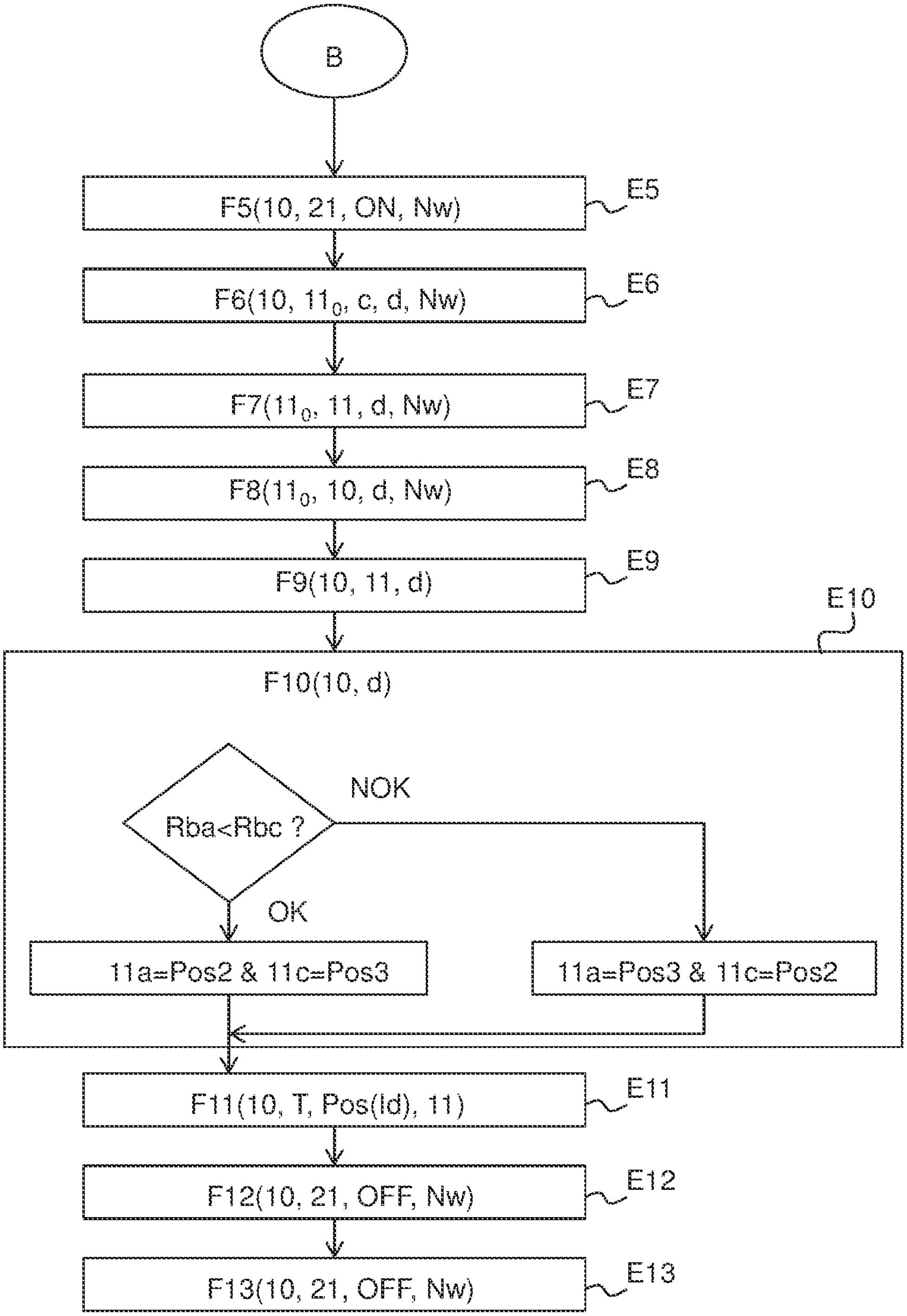
FIG. 8 is a diagram illustrating the location method of FIG. 6 implemented when the vehicle network comprises three secondary nodes, according to one non-limiting embodiment.
Figure 9:
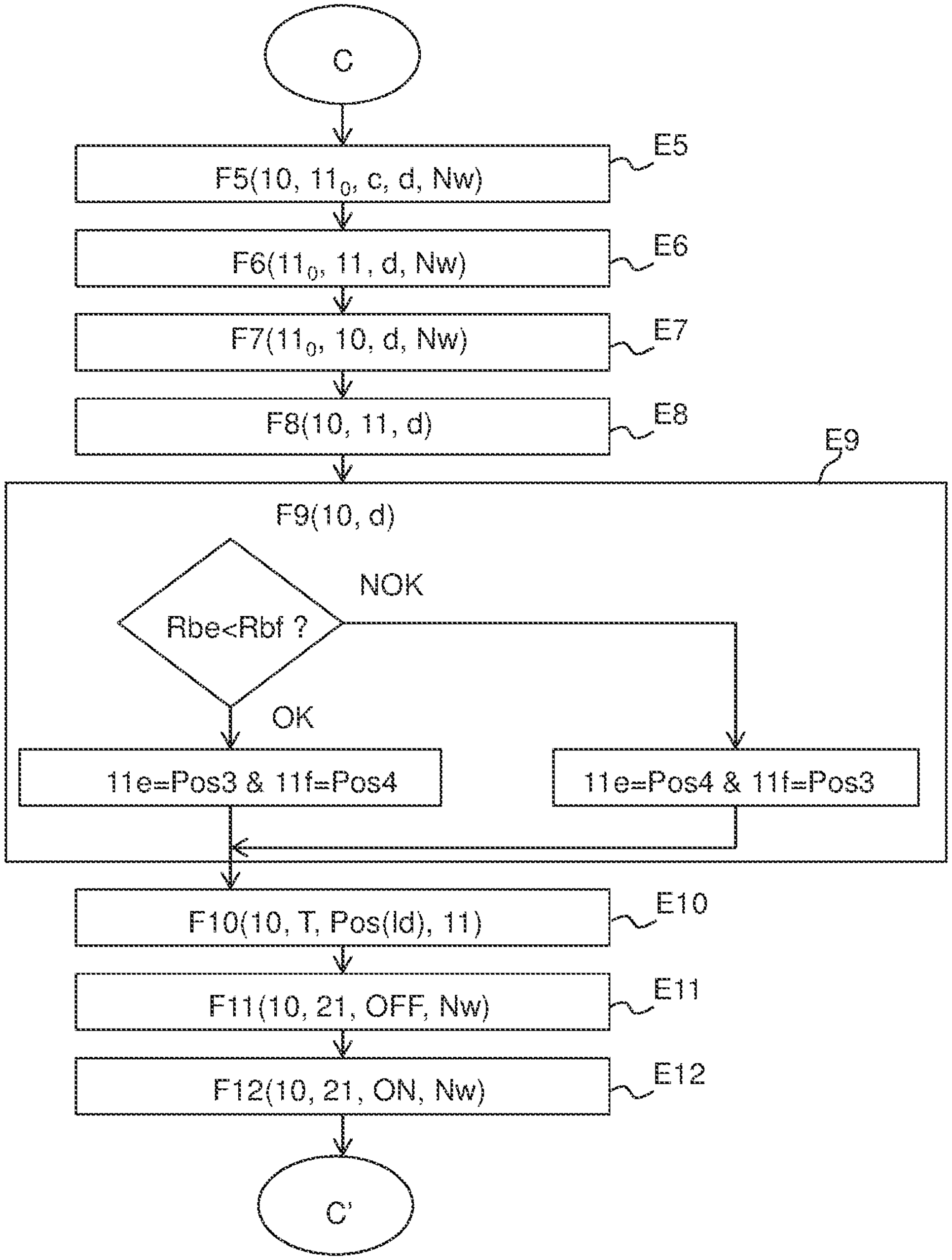
FIG. 9 is a diagram illustrating the location method of FIG. 6 implemented when the vehicle network comprises six secondary nodes, according to one non-limiting embodiment.
Figure 10:
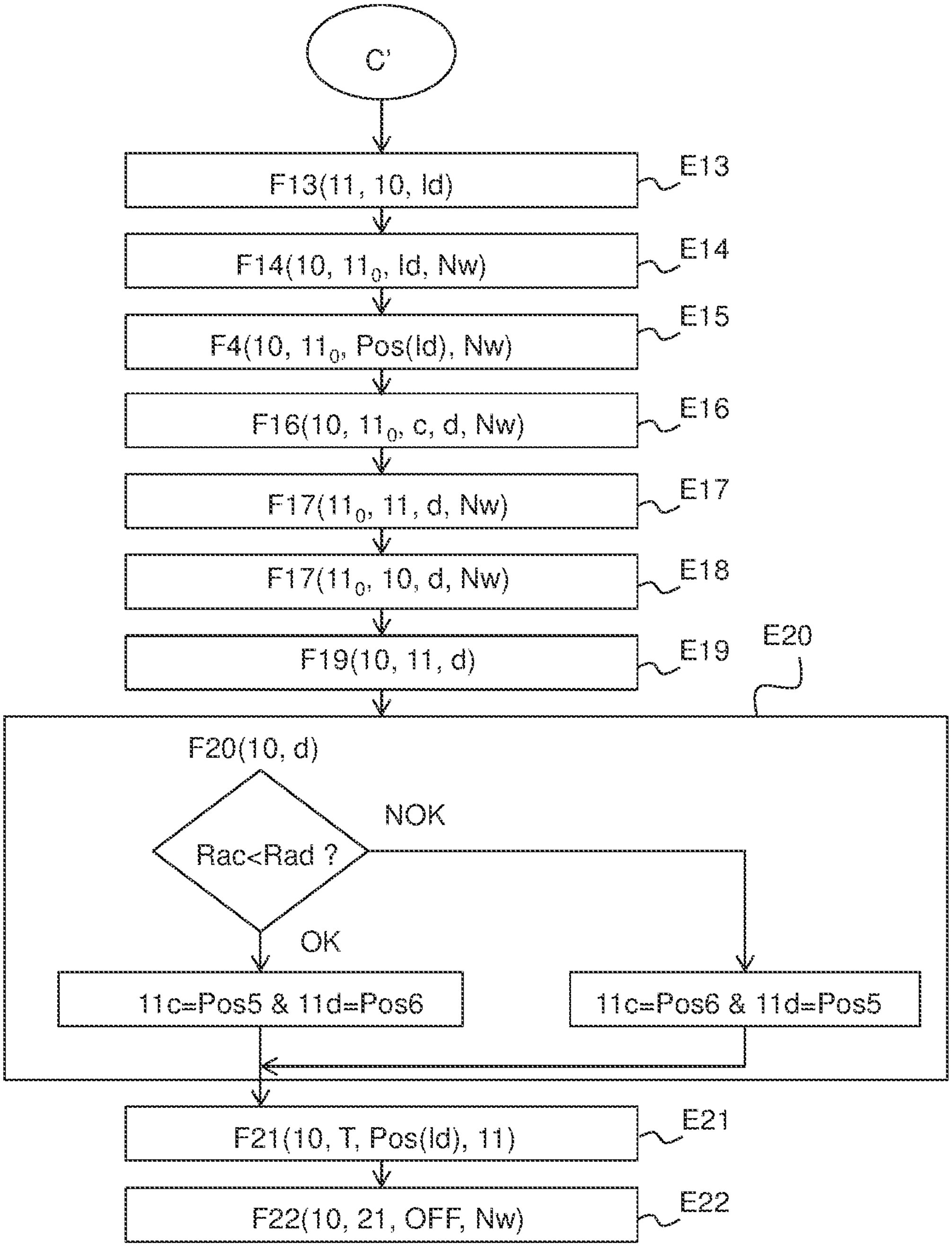
FIG. 10 is the remainder of the diagram illustrating the location method of FIG. 9 implemented according to one non-limiting embodiment.
Figure 11:
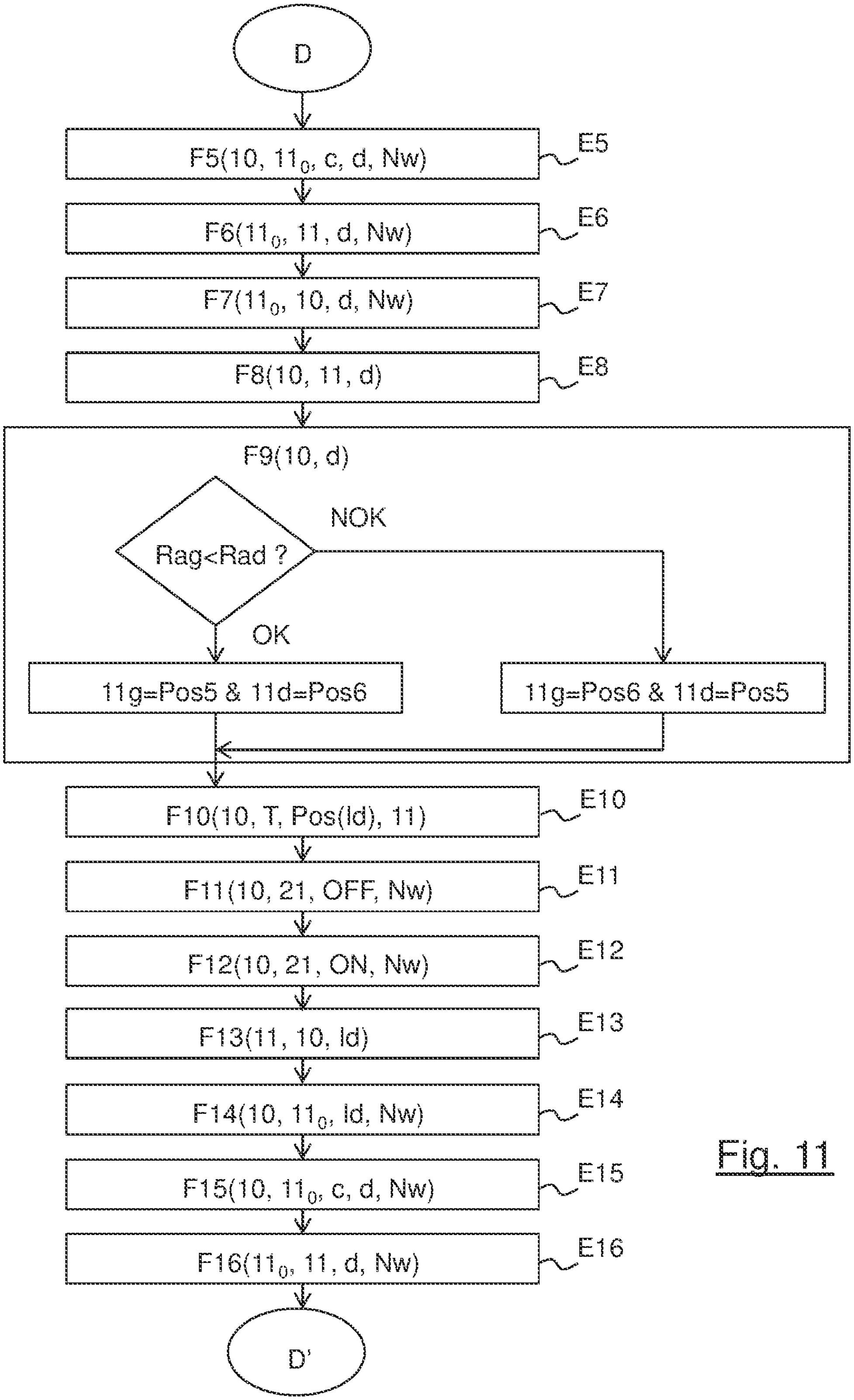
FIG. 11 is a diagram illustrating the location method of FIG. 6 implemented when the vehicle network comprises seven secondary nodes, according to one non-limiting embodiment.

Thus:

- the steps of the location method 4 of FIG. 7 are implemented by the location device of FIG. 2, according to one non-limiting embodiment;
- the steps of the location method 4 of FIG. 8 are implemented by the location device of FIG. 3, according to one non-limiting embodiment;
- the steps of the location method 4 of FIGS. 9 and 10 are implemented by the location device of FIG. 4, according to one non-limiting embodiment;
- the steps of the location method 4 of FIG. 11 are implemented by the location device of FIG. 5, according to one non-limiting embodiment.

The case of n=2 is described hereafter.

In the non-limiting example of FIG. 2, the reference secondary node $\mathbf{11}_0$ is the node 11*b* and it is at the centre-rear position Pos (referenced Pos1).

Thus, when n=2, as illustrated in FIG. 7:

In one non-limiting embodiment, in a step E5, illustrated as F5(10, 21, OFF, Nw), the main node 10 deactivates the power supply 21 of the first sub-network Nw1 after locating said reference secondary node $\mathbf{11}_0$ as described above. It should be noted that this step also can be carried out at the same time as or after the step E9.

In a step E6, illustrated as F6(10, 21, ON, Nw), the main node 10 activates the power supply 21 of the second sub-network Nw2.

In a step E7, illustrated as F7(11, 10, Id), the secondary node 11 of said second network Nw2 sends said main node 10 their unique network identifier Id. They send it as soon as the second sub-network Nw2 is powered.

In a step E8, illustrated as F8(10, T, Pos(Id), 11), the main node 10 identifies and locates the secondary node 11 in said second sub-network Nw2 by means of its unique network identifier Id and of the architecture T of the vehicle network Nv. In the non-limiting example of FIG. 2, the secondary node 11 in the second sub-network Nw2 is the secondary node 11*a*. It is located 11*b* at the centre-front position Pos (referenced Pos2).

As it has finished locating all the secondary nodes 11 of the first sub-network Nw1 and of the second sub-network Nw2, the main node 10 deactivates the power supply 21 of the second sub-network Nw2 (step E9, illustrated as F9(10, 21, OFF, Nw)).

The case of n=3 is described hereafter.

It should be noted that the reference secondary node $\mathbf{11}_0$ is defined in this case in the sub-network Nw that comprises only one secondary node 11, namely, in this case, the first sub-network Nw1. In the non-limiting example of FIG. 3, the reference secondary node $\mathbf{11}_0$ is the node 11*b* and it is at the centre-right position Pos (referenced Pos1).

Thus, when n=3, as illustrated in FIG. 8:

In a step E5, illustrated as F5(10, 21, ON, Nw), the main node 10 activates the power supply 21 of the second sub-network Nw2.

In a step E6, illustrated as F6(10, $\mathbf{11}_0$, c, d, Nw), the main node 10 sends a command c to said reference secondary node $\mathbf{11}_0$ to measure a distance d between itself and each other secondary node 11 of said second sub-network Nw2. In the non-limiting example of FIG. 3, the secondary nodes 11 of the second sub-network Nw12 are the nodes 11*a* and 11*c*.

In a step E7, illustrated as F7($\mathbf{11}_0$, 11, d, Nw), said reference secondary node $\mathbf{11}_0$ measures said distance d. In this case, it measures two distances d with the two secondary nodes 11 of the second sub-network Nw2.

In a step E8, illustrated as F8(11$_0$, 10, d, Nw), said reference secondary node 11$_0$ sends said main node 10 said distances d between itself and the two secondary nodes 11 of the second sub-network Nw2. It thus sends two distances d. In the non-limiting example of FIG. 3, the distances d are the distances Rba (between said reference secondary node 11_b_ and the secondary node 11_a_) and Rbc (between said reference secondary node 11_b_ and the secondary node 11_c_).

In a step E9, illustrated as F9(10, 11, d), the main node 10 receives said distances d.

In a step E10, illustrated as F10(10, d), the main node 10 compares them. Thus, it will define one distance d as being greater than another. In the non-limiting example of FIG. 3, the distance Rba is greater than the distance Rbc.

In a step E11, illustrated as F11(10, T, Pos(Id), 11), the main node 10 locates the secondary nodes 11 of the second sub-network Nw2 as a function of the architecture T of the vehicle network Nv and of said comparison. For each secondary node 11 of the second sub-network Nw2, it thus associates its unique network identifier Id with a position Pos in the motor vehicle 2.

Thus, if Rba is less than Rbc (OK branch in FIG. 8), then the main node 10 deduces that the secondary node 11_a_ is at the centre-left position Pos (referenced Pos2) because it is closer to the reference secondary node 11$_0$, in this case 11_b_, and that the secondary node 11_c_ is at the centre-front position Pos (referenced Pos3). However, if Rba is not less than Rbc but is greater than Rbc (NOK branch in FIG. 8), then the main node 10 deduces that the secondary node 11_a_ is at the centre-front position Pos and the secondary node 11_c_ is at the centre-left position Pos. In the non-limiting example of FIG. 3, as Rba>Rbc, the main node 10 associates the unique network identifier Id of the secondary node 11_a_ with the centre-front position Pos of the motor vehicle 2, referenced Pos3, and the unique network identifier Id of the secondary node 11_c_ with the centre-left position Pos of the motor vehicle 2, referenced Pos2.

As it has finished locating all the secondary nodes 11 of the first sub-network Nw1 and of the second sub-network Nw2, the main node 10 deactivates the power supply 21 of the first sub-network Nw1 (step E12, illustrated as F12(10, 21, OFF, Nw)) and the power supply 21 of the second sub-network Nw2 (step E13, illustrated as F13(10, 21, OFF, Nw)). FIG. 8 illustrates these two steps as being consecutive, but of course they can be carried out at the same time.

The case of n=6 is described hereafter.

It should be noted that the reference secondary node 11$_{01}$ is defined in the first sub-network Nw1 and the reference secondary node 11$_{02}$ is defined in the second sub-network Nw2. In the non-limiting example of FIG. 4, the reference secondary node 11$_{01}$ is the node 11_b_ and it is at the centre-rear position Pos (referenced Pos1), and the reference secondary node 11$_{02}$ is the node 11_a_ and it is at the centre-front position Pos (referenced Pos2).

Thus, when n=6, as illustrated in FIG. 9:

In a step E5, illustrated as F5(10, 11$_0$, c, d, Nw), the main node 10 sends a command c to said reference secondary node 11$_{01}$, in this case 11_b_, of said first sub-network Nw1 to measure a distance d between itself and each other secondary node 11 of said first sub-network Nw1. In the non-limiting example of FIG. 4, the other secondary nodes 11 of the first sub-network Nw1 are the nodes 11_e_ and 11_f_.

In a step E6, illustrated as F6(11$_0$, 11, d, Nw), said reference secondary node 11$_0$ measures said distance d. In this case, it measures two distances d with the two secondary nodes 11 of the first sub-network Nw1.

In a step E7, illustrated as F7(11$_0$, 10, d, Nw), said reference secondary node 11$_0$ sends said main node 10 said distances d between itself and the two secondary nodes 11 of the first sub-network Nw1. It thus sends two distances d. In the non-limiting example of FIG. 4, the distances d are the distances Rbe (between said reference secondary node 11_b_ and the secondary node 11_e_) and Rbf (between said reference secondary node 11_b_ and the secondary node 11_f_).

In a step E8, illustrated as F8(10, 11, d), the main node 10 receives said distances d.

In a step E9, illustrated as F9(10, d), the main node 10 compares them. Thus, it will define one distance d as being greater than another. In the non-limiting example of FIG. 4, the distance Rbf is greater than the distance Rbe.

In a step E10, illustrated as F10(10, T, Pos(Id), 11), the main node 10 locates the other secondary nodes 11 of the first sub-network Nw1 as a function of the architecture T of the vehicle network Nv and of said comparison. For each secondary node 11 of the first sub-network Nw1 (apart from the reference secondary node 11$_{01}$ that it has already located), it thus associates its unique network identifier Id with a position Pos in the motor vehicle 2.

Thus, if Rbe is less than Rbf (OK branch in FIG. 9), then the main node 10 deduces that the secondary node 11_e_ is at the rear-left position Pos (referenced Pos3) because it is closer to the reference secondary node 11$_{01}$, in this case 11_b_, and that the secondary node 11_f_ is at the front-left position Pos (referenced Pos4). However, if Rbe is not less than Rbf but is greater than Rbf (NOK branch in FIG. 9), then the main node 10 deduces that the secondary node 11_e_ is at the front-left position Pos because it is further away from the reference secondary node 11$_{01}$, in this case 11_b_, and that the secondary node 11_f_ is at the rear-left position Pos. In the non-limiting example of FIG. 4, as Rbe<Rbf, the main node 10 associates the unique network identifier Id of the secondary node 11_e_ with the rear-left position Pos of the motor vehicle 2, referenced Pos3, and the unique network identifier Id of the secondary node 11_f_ at the front-left position Pos of the motor vehicle 2, referenced Pos4.

As it has finished locating all the secondary nodes 11 of the first sub-network Nw1, in one non-limiting embodiment, in a ninth step E11, illustrated as F11(10, 21, OFF, Nw), the main node 10 deactivates the power supply 21 of the first sub-network Nw1 after locating the secondary nodes 11 of the first sub-network Nw1. It should be noted that this step also can be carried out at the same time as or after the step E22.

Thus, after locating the secondary nodes 11 of the first sub-network Nw1, the main node 10 will be able to locate the secondary nodes 11 of the second sub-network Nw2. To this end, it carries out the following steps.

In a step E12, illustrated as F12(10, 21, ON, Nw), the main node 10 activates the power supply 21 of the second sub-network Nw2.

The main node 10 repeats steps E2 to E11 for the second sub-network Nw2.

Thus, as illustrated in FIG. 10:

In a step E13, illustrated as F13(11, 10, Id), the m secondary nodes 11 of said second sub-network Nw2 send said main node 10 their unique network identifier Id. They send it as soon as the second sub-network Nw2 is powered.

In a step E14, illustrated as F14(10, 11$_0$, Id, Nw), the main node 10 identifies the reference secondary node 11$_{02}$ in said second sub-network Nw2 by means of its unique network identifier Id.

As the main node 10 knows the architecture T of the vehicle network Nv, and notably of each sub-network Nw, it will know from their unique network identifier Id which secondary nodes 11 are located inside or outside the motor vehicle 2. As a function of the architecture T and of the received unique identifiers Id, it will be possible to determine the reference secondary node $\mathbf{11}_{02}$, in this case 11*a*, as being that which is located inside, in the non-limiting example, while the other secondary nodes 11 (in this case 11*c* and 11*d*) of the second sub-network Nw2 are located outside.

In a step E15, illustrated as F15(10, $\mathbf{11}_0$, Pos(Id), Nw), a reference secondary node $\mathbf{11}_{02}$ is located in said second sub-network Nw1 by means of its unique network identifier Id.

In a step E16, illustrated as F16(10, $\mathbf{11}_0$, c, d, Nw), the main node 10 sends a command c to said reference secondary node $\mathbf{11}_{02}$ to measure a distance d between itself and each other secondary node 11 of said second sub-network Nw2. In the non-limiting example of FIG. 4, the other secondary nodes 11 of the second sub-network Nw2 are the nodes 11*c* and 11*d*.

In a step E17, illustrated as F17($\mathbf{11}_0$, 11, d, Nw), said reference secondary node $\mathbf{11}_0$ measures said distance d. In this case, it measures two distances d with the two secondary nodes 11 of the second sub-network Nw2.

In a step E18, illustrated as F18($\mathbf{11}_0$, 10, d, Nw), said reference secondary node $\mathbf{11}_0$ sends said main node 10 said distances d between itself and the other secondary nodes 11 of the second sub-network Nw2. In the non-limiting example of FIG. 4, it thus sends two distances d: the distances d are the distances Rac (between said reference secondary node 11*a* and the secondary node 11*c*) and Rad (between said reference secondary node 11*a* and the secondary node 11*d*).

In a step E19, illustrated as F19(10, 11, d), the main node 10 receives said distances d.

In a step E20, illustrated as F20(10, d), the main node 10 compares them. Thus, it will define one distance d as being greater than another. In the non-limiting example of FIG. 4, the distance Rad is greater than the distance Rac.

In a step E21, illustrated as F21(10, T, Pos(Id), 11), the main node 10 locates the other secondary nodes 11 of the second sub-network Nw2 as a function of the architecture T of the vehicle network Nv and of said comparison. For each secondary node 11 of the second sub-network Nw2 (apart from the reference secondary node $\mathbf{11}_{02}$ that it has already located), it thus associates its unique network identifier Id with a position Pos in the motor vehicle 2.

Thus, if Rac is less than Rad (OK branch in FIG. 10), then the main node 10 deduces that the secondary node 11*c* is at the front-right position Pos (referenced Pos5) because it is closer to the reference secondary node $\mathbf{11}_{02}$, in this case 11*a*, and that the secondary node 11*d* is at the rear-right position Pos (referenced Pos6). However, if Rac is not less than Rad but is greater than Rad (NOK branch in FIG. 10), then the main node 10 deduces that the secondary node 11*c* is at the rear-right position Pos because it is further away from the reference node $\mathbf{11}_{02}$, in this case 11*a*, and that the secondary node 11*d* is at the front-right position Pos. In the non-limiting example of FIG. 4, as Rac<Rad, the main node 10 associates the unique network identifier Id of the secondary node 11*c* with the front-right position Pos of the motor vehicle 2, referenced Pos5, and the unique network identifier Id of the secondary node 11*d* with the rear-right position Pos of the motor vehicle 2, referenced Pos6.

Finally, as it has finished locating all the secondary nodes 11 of the second sub-network Nw2, and consequently all the secondary nodes 11 of the vehicle network Nv, in a step E22, illustrated as F22(10, 21, OFF, Nw), the main node 10 deactivates the power supply 21 of the second sub-network Nw2.

The case of n=7 is described hereafter.

It should be noted that the reference secondary node $\mathbf{11}_{01}$ is defined in the first sub-network Nw1, the reference secondary node $\mathbf{11}_{02}$ and the reference secondary node $\mathbf{11}_{03}$ are defined in the second sub-network Nw2. In the non-limiting example of FIG. 5, the reference secondary node $\mathbf{11}_{01}$ is the node 11*a* and it is at the centre-front position Pos (referenced Pos1); the reference secondary node $\mathbf{11}_{02}$ is the node 11*b* and it is at the centre-right position Pos (referenced Pos2); and the reference secondary node $\mathbf{11}_{03}$ is the node 11*c* and it is at the centre-left position Pos (referenced Pos7).

Thus, when n=7, as illustrated in FIG. 11:

When n=7, the same steps E5 to E13 described for n=6 are carried out, with a reference secondary node $\mathbf{11}_{01}$ that is the secondary node 11*a* in the first sub-network Nw1 and the other two secondary nodes 11 of the first sub-network Nw1 that are the secondary nodes 11*d* and 11*g*. Distances Rag and Rad are obtained with Rag<Rad and the front-right position Pos (referenced Pos5) assigned by the main node 10 to the secondary node 11*g* and the rear-right position Pos (referenced Pos6) assigned by the main node 10 to the secondary node 11*d*. In this case, it should be noted that the step E11 also can be carried out at the same time as or after the step E23.

Then, in a step E14, illustrated as F14(10, $\mathbf{11}_0$, Id, Nw), the main node 10 identifies the two reference secondary nodes $\mathbf{11}_{02}$, $\mathbf{11}_{03}$ in said second sub-network Nw2 by means of their unique network identifier Id.

In the non-limiting example of FIG. 5, the two reference secondary nodes $\mathbf{11}_{02}$, $\mathbf{11}_{03}$ of the second sub-network Nw2 are the secondary nodes 11*b* and 11*c*, respectively.

As the main node 10 knows the architecture T of the vehicle network Nv, and notably of each sub-network Nw, it will know from their unique network identifier Id which secondary nodes 11 are located inside or outside the motor vehicle 2. As a function of the architecture T and of the received unique identifiers Id, it will be able to determine the reference secondary node $\mathbf{11}_{02}$, in this case 11*b*, and the reference secondary node $\mathbf{11}_{03}$, in this case 11*c*, as being those that are located inside, while the other secondary nodes 11 (in this case 11*e* and 11*f*) of the second sub-network Nw2 are located outside. However, for the instant, the main node 10 does not yet know how to differentiate the reference secondary node $\mathbf{11}_{02}$ from the reference secondary node $\mathbf{11}_{03}$ and therefore how to precisely locate them. By virtue of the architecture T of the vehicle network Nv, the main node 10 simply knows that, from among the reference secondary node 11*b* and the reference secondary node 11*c*, one is located at the centre-right position and the other is located at the centre-left position.

For each of the two reference secondary nodes $\mathbf{11}_{02}$, $\mathbf{11}_{03}$:

In a step E15, illustrated as F15(10, $\mathbf{11}_0$, c, d, Nw), the main node 10 sends a command c to said reference secondary node $\mathbf{11}_{02}$, $\mathbf{11}_{03}$ to measure a distance d between themselves and each other secondary node 11 of said second sub-network Nw2. In the non-limiting example of FIG. 5, the other secondary nodes 11 of the second sub-network Nw2 are the nodes 11*e* and 11*f*.

In a step E16, illustrated as F16($\mathbf{11}_0$, 11, d, Nw), said reference secondary nodes $\mathbf{11}_{02}$, $\mathbf{11}_{03}$ measure said distance d. In this case, they each take two distance d measurements with the two secondary nodes 11 of the second sub-network Nw2.

Figure 12:
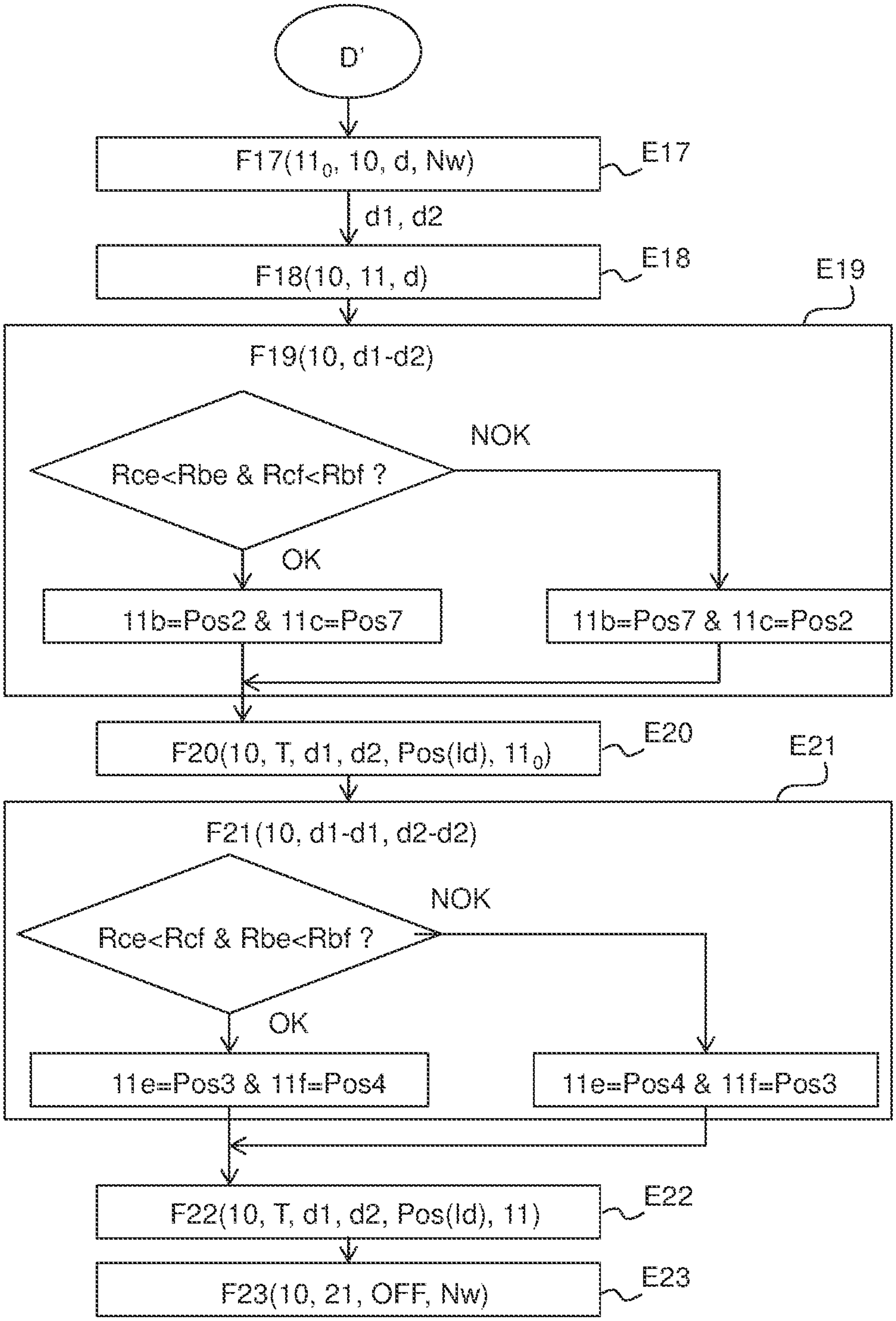
FIG. 12 is the remainder of the diagram illustrating the location method of FIG. 11, according to one non-limiting embodiment.

As illustrated in FIG. 12, in a step E17, illustrated as F17(11$_0$, 10, d, Nw), said reference secondary nodes 11$_{02}$, 11$_{03}$ send said main node 10 said distances d between themselves and the other secondary nodes 11 of the second sub-network Nw2. In the non-limiting example of FIG. 5, they thus each send:

- primary distances d1 for a first reference secondary node 11$_{02}$ that are the distances Rbe (between said reference secondary node 11*b* and the secondary node 11*e*) and Rbf (between said reference secondary node 11*b* and the secondary node 11*f*);
- secondary distances d2 for a second reference secondary node 11$_{03}$ that are the distances Rce (between said reference secondary node 11*c* and the secondary node 11*e*) and Rcf (between said reference secondary node 11*c* and the secondary node 11*f*).

In a step E18, illustrated as F18(10, 11, d), the main node 10 receives said primary distances d1 originating from the first reference secondary node 11$_{02}$ and said secondary distances d2 originating from the second reference secondary node 11$_{03}$.

In a step E19, illustrated as F19(10, d1-d2), the main node 10 compares each primary distance d1 with each secondary distance d2 corresponding to the same other secondary node 11. This comparison is called a primary comparison. Thus, in the non-limiting example of FIG. 5, it will compare Rce and Rbe, and Rcf and Rbf. Thus, it will define that a primary distance d1 is greater or smaller than a secondary distance d2. In the non-limiting example of FIG. 5, Rce<Rbe and Rcf<Rbf.

Thus, if Rce<Rbe and Rcf<Rbf (OK branch in FIG. 11), then the main node 10 deduces that the reference secondary node 11$_{03}$ (in this case 11*c*) is closer to the secondary nodes 11*e* and 11*f* than the reference secondary node 11$_{02}$ (in this case 11*b*). Thus, it deduces that the reference secondary node 11$_{02}$ (in this case 11*b*) is at the centre-right position Pos (referenced Pos2) and that the reference secondary node 11$_{03}$ (in this case 11*c*) is at the centre-left position Pos (referenced Pos7), with position Pos2 being further away from positions Pos3 and Pos4 than position Pos7. However, if this is not the case (therefore, for all the other cases), the main node 10 deduces that the reference secondary node 11$_{02}$ (in this case 11*b*) is at the centre-left position Pos (referenced Pos7) and the reference secondary node 11$_{03}$ (in this case 11*c*) is at the centre-right position Pos (referenced Pos2). In the non-limiting example of FIG. 5, as Rce<Rbe and Rcf<Rbf, it associates the unique network identifier Id of the reference secondary node 11*b* with the centre-right position Pos of the motor vehicle 2, referenced Pos2, and the unique network identifier Id of the reference secondary node 11*c* with the centre-left position Pos of the motor vehicle 2, referenced Pos7.

Thus, in a step E20, illustrated as F20(10, T, d1, d2, Pos(Id), 11$_0$), as a function of the architecture T of the vehicle network Nv and of said primary comparison, the main node 10 thus locates the two reference secondary nodes 11$_{02}$, 11$_{03}$. Thus, it associates their unique network identifier Id with a position Pos in the motor vehicle 2. In the non-limiting example of FIG. 5, it determines that the reference secondary node 11$_{02}$ is positioned at the centre-right of the motor vehicle 2, while the reference secondary node 11$_{03}$ is positioned at the centre-left.

In a step E21, illustrated as F21(10, d1-d1, d2-d2), the main node 10 compares the primary distances d1 with each other and the secondary distances d2 with each other. In the non-limiting example, the main node 10 compares the primary distances Rbe and Rbf with each other, and the secondary distances Rce and Rcf with each other. In the illustrated non-limiting example, Rce<Rcf and Rbe<Rbf.

Thus, if Rce<Rcf and Rbe<Rbf (OK branch in FIG. 11), then the main node 10 deduces:

- that the secondary node 11*e* is at the rear-left position Pos (referenced Pos3) because it is closer to the reference secondary node 11$_{02}$, in this case 11*b*, and the reference secondary node 11$_{03}$, in this case 11*c*; and
- that the secondary node 11*f* is at the front-left position Pos (referenced Pos4) as it is further away from the reference secondary node 11$_{02}$, in this case 11*b*, and from the reference secondary node 11$_{03}$, in this case 11*c*.

However, if this is not the case (therefore, for all the other cases), the main node 10 deduces:

- that the secondary node 11*e* is at the front-left position Pos (referenced Pos7) because it is further away from the reference secondary node 11$_{02}$, in this case 11*b*, and from the reference secondary node 11$_{03}$, in this case 11*c*; and
- that the reference secondary node 11*f* is at the rear-left position Pos (referenced Pos6) because it is closer to the reference secondary node 11$_{02}$, in this case 11*b*, and the reference secondary node 11$_{03}$, in this case 11*c*.

In the non-limiting example of FIG. 5, as Rce<Rcf and Rbe<Rbf, it associates the unique network identifier Id of the reference secondary node 11*e* with the rear-left position Pos of the motor vehicle 2, referenced Pos3, and the unique network identifier Id of the reference secondary node 11*f* with the front-left position Pos of the motor vehicle 2, referenced Pos4.

Thus, in a step E22, illustrated as F22(10, T, d1, d2, Pos(Id), 11), the main node 10 locates the other secondary nodes 11 of the second sub-network Nw2 as a function of the architecture T of the vehicle network Nv and of said secondary comparison. For each secondary node 11 of the second sub-network Nw2 (apart from the reference secondary nodes 11$_{02}$, 11$_{03}$ that it has already located), it thus associates its unique network identifier Id with a position Pos in the motor vehicle 2.

Finally, as it has finished locating all the secondary nodes 11 of the second sub-network Nw2, and consequently all the secondary nodes 11 of the vehicle network Nv, in a step E23, illustrated as F23(10, 21, OFF, Nw), the main node 10 deactivates the power supply 21 of the second sub-network Nw2.

As described above, it should be noted that, for all the described cases n, the location method 4 comprises the step of deactivating the power supply of said second sub-network Nw2 after locating the other secondary nodes 11 of said second sub-network Nw2.

Of course, the description of the invention is not limited to the embodiments described above and to the field described above. Thus, the invention can be applied to fields other than the field of motor vehicles, such as, in non-limiting examples, the field of railways, the field of aeronautics, the field of IOT comprising the connected objects.

Thus, the invention that has been described notably has the following advantages:

- it allows all the secondary nodes 11 of a vehicle 2 to be located;
- it allows the secondary nodes 11 that are inside or outside the vehicle 2 to be located;

it avoids pre-identifying the secondary nodes 11 before installing them on the vehicle 2, and therefore saves time on the production line;

it allows automatic identification of the secondary nodes 11 without the intervention of an operator, and therefore saves time on the production line;

it avoids manual identification by means of an external tool handled by an operator, and therefore saves time on the production line;

it avoids having additional wires connected to the secondary nodes 11 and additional electrical components on the secondary nodes 11 in order to locate them. The mass of the vehicle 2, and consequently the energy consumed by the vehicle, are reduced, and less fuel or electricity is required to move the vehicle 2. Consequently, the mass of CO2 used by the vehicle 2 is reduced.

The invention claimed is:

1. A location device for locating secondary nodes of a vehicle, the location device comprising:

a plurality of nodes, including a main node and n secondary nodes, with n=2 to N integers, with the whole forming a vehicle network, wherein the vehicle network comprises two sub-networks each independently powered by an electrical power supply, each sub-network comprising m secondary nodes, with m=1 to M integers, wherein each secondary node has a unique network identifier indicating whether it is inside or outside the vehicle, and wherein the main node is configured for:

knowing the architecture of the vehicle network;

independently activating and deactivating the electrical power supply of each of the two sub-networks;

identifying and locating at least one reference secondary node in at least one of the two sub-networks by its unique network identifier;

sending a command to the at least one reference secondary node to measure a distance between itself and the other secondary nodes of one of the two sub-networks;

receiving the distances and comparing them with each other;

locating the other secondary nodes as a function of the architecture of the vehicle network and of the comparison;

locating a secondary node in a sub-network comprising a single secondary node that is not the at least one reference secondary node as a function of the architecture of the vehicle network;

wherein the at least one reference secondary node is configured for:

measuring a distance between itself and the other secondary nodes of one of the two sub-networks;

sending the main node a distance between itself and the other secondary nodes of one of the two sub-networks; and sending its unique network identifier to the main node when the sub-network it belongs to is powered.

2. The location device according to claim 1, wherein if n>2, then the at least one reference secondary node is located at different distances from the other secondary nodes.

3. The location device according to claim 1, wherein if n<=3, then the main node is configured for identifying and locating a single reference secondary node.

4. The location device according to claim 3, wherein the reference secondary node is located in a sub-network where m=1.

5. The location device according to claim 4, wherein if n=2, and m=1 for each of the two sub-networks, then the main node is further configured for:

activating the electrical power supply of the sub-network where the reference secondary node is located so that it can be identified and located; and activating the electrical power supply of the other sub-network in order to be able to locate its single secondary node as a function of the architecture of the vehicle network.

6. The location device according to claim 1, wherein if n=3, and m=1 for one of the two sub-networks, and m=2 for the other one of the two sub-networks, then the main node is further configured for:

activating the power supply of the sub-network where the reference secondary node is located so that it can be identified and located, sending the command, receiving the distances and comparing them, and locating the other secondary nodes in the other sub-network as a function of the architecture of the vehicle network and of the comparison;

activating the power supply of the other sub-network after locating the reference secondary node and before sending the command; and wherein the reference secondary node is configured for measuring a distance between itself and the other secondary nodes of the other sub-network.

7. The location device according to claim 1, wherein if n>=6, then the main node is configured for identifying and locating at least two reference secondary nodes.

8. The location device according to claim 7, wherein each reference secondary node is located inside the vehicle, while the other secondary nodes of the sub-network to which each reference secondary node belongs are located outside, or vice versa.

9. The location device according to claim 7, wherein if m=3 for a sub-network, only one reference secondary node is located in the sub-network, and the main node is further configured for:

activating the power supply of the sub-network in order to be able to identify and locate its reference secondary node, sending the command, receiving the distances and comparing them, and locating the other secondary nodes in the sub-network as a function of the architecture of the vehicle network and of the comparison, wherein the reference secondary node of the sub-network is configured for measuring a distance between itself and the other secondary nodes of the sub-network to which it belongs.

10. The location device according to claim 7, wherein if m=4 for a sub-network, two reference secondary nodes are located in the sub-network.

11. The location device according to claim 10, wherein the main node is further configured for:

activating the power supply of the sub-network;

identifying the two reference secondary nodes by means of their unique network identifier;

sending a command, respectively to the two reference secondary nodes, so that they measure distances between themselves and the other secondary nodes of the sub-network, respectively resulting in primary distances and secondary distances;

receiving the primary distances and the secondary distances;

comparing each primary distance with each secondary distance corresponding to the same other secondary node;

locating the reference secondary nodes as a function of the architecture of the vehicle network and of the comparisons;

comparing the primary distances with each other and the secondary distances with each other; and locating the other secondary nodes as a function of the architecture of the vehicle network and of the comparisons;

wherein each of the two reference secondary nodes is configured for measuring a distance between itself and the other secondary nodes of the sub-network to which it belongs.

12. A location method for locating secondary nodes of a vehicle, the vehicle comprising a plurality of nodes, including a main node and n secondary nodes, linked together via a vehicle network, with n=1 to N integers, wherein each secondary node has a unique network identifier indicating whether it is inside or outside the vehicle, the vehicle network comprising two sub-networks each independently powered by an electrical power supply, wherein each sub-network comprises m secondary nodes, with m=1 to M integers, wherein the method comprises:

activating, by the main node, the electrical power supply of a first sub-network;

sending, by the m secondary nodes of the first sub-network, the main node their unique network identifier;

identifying and locating, by the main node, a reference secondary node in the first sub-network by means of its unique network identifier;

if n=2:

activating, by the main node, the electrical power supply of the second sub-network;

sending, by the secondary node of the second sub-network, the main node its unique network identifier;

identifying and locating, by the main node, the secondary node in the second sub-network as a function of the architecture of the vehicle network, wherein the architecture of the vehicle network is known to the main node;

if n=3:

activating, by the main node, the power supply of the second sub-network;

sending, by the main node, a command to the reference secondary node to measure a distance between itself and each other secondary node of the second sub-network;

measuring, by the reference secondary node, a distance between itself and each other secondary node and returning it to the main node;

receiving, by the main node, the distances and comparing them with each other;

locating, by the main node, the other secondary nodes in the second sub-network as a function of the architecture of the vehicle network and of the comparison;

if n=6 or n=7:

sending, by the main node, a command to the reference secondary node to measure a distance between itself and each other secondary node of the first sub-network;

measuring, by the reference secondary node, a distance between itself and each other secondary node and returning it to the main node;

receiving, by the main node, the distances and comparing them with each other;

locating, by the main node, the other secondary nodes in the first sub-network as a function of the architecture of the vehicle network and of the comparison;

activating the electrical power supply of the second sub-network;

sending, by the m secondary nodes of the second sub-network, the main node their unique network identifier;

if n=6:

identifying and locating, by the main node, a reference secondary node in the second sub-network by means of its unique network identifier;

repeating the steps of sending a command, of measuring distance, of returning the distances, of receiving the distances, of comparing the distances, and of locating the other secondary nodes for the second sub-network;

if n=7:

identifying, by the main node, two reference secondary nodes in the second sub-network by means of their unique network identifier; and, for each of the two reference secondary nodes:

sending, by the main node, a command to the reference secondary nodes to measure a distance between themselves and each other secondary node of the second sub-network;

measuring, by the reference secondary nodes, a distance between themselves and each other secondary node and returning them to the main node;

receiving, by the main node, primary distances originating from one of the two reference secondary nodes, and secondary distances originating from the other one of the two reference secondary nodes;

comparing each primary distance with each secondary distance corresponding to the same other secondary node;

locating the two reference secondary nodes as a function of the architecture of the vehicle network and of the comparison;

comparing the primary distances with each other and the secondary distances with each other; and locating the other secondary nodes of the second sub-network as a function of the architecture of the vehicle network and of the comparison.

13. The location method according to claim 12, wherein the electrical power supplies of the two sub-networks are initially deactivated.

14. The location method according to claim 12, wherein the location method further comprises, for all the cases n, deactivating the power supply of the first sub-network after locating the other secondary nodes of the first sub-network as described above, and deactivating the power supply of the second sub-network after locating the other secondary nodes of the second sub-network as described above.

* * * * *